(12) United States Patent
Yeatts et al.

(10) Patent No.: US 11,539,826 B2
(45) Date of Patent: Dec. 27, 2022

(54) 5G FWA DEVICE SELF-INSTALLATION APPLICATION

(71) Applicant: Inseego Corp., San Diego, CA (US)

(72) Inventors: Christopher Yeatts, San Diego, CA (US); Vishal Donthireddy, San Diego, CA (US); Sangram Tidke, San Diego, CA (US); James Kappes, San Diego, CA (US)

(73) Assignee: Inseego Corp., San Diego, CA (US)

( * ) Notice: Subject to any disclaimer, the term of this patent is extended or adjusted under 35 U.S.C. 154(b) by 116 days.

(21) Appl. No.: 17/028,197

(22) Filed: Sep. 22, 2020

(65) Prior Publication Data
US 2022/0094777 A1    Mar. 24, 2022

(51) Int. Cl.
| | |
|---|---|
| *H04M 1/72406* | (2021.01) |
| *H04W 76/14* | (2018.01) |
| *H04W 4/024* | (2018.01) |
| *H04B 17/309* | (2015.01) |
| *H04W 24/10* | (2009.01) |
| *H04W 4/80* | (2018.01) |
| *H04W 84/14* | (2009.01) |
| *H04W 88/04* | (2009.01) |

(52) U.S. Cl.
CPC ...... *H04M 1/72406* (2021.01); *H04B 17/309* (2015.01); *H04W 4/024* (2018.02); *H04W 24/10* (2013.01); *H04W 76/14* (2018.02); *H04W 4/80* (2018.02); *H04W 84/14* (2013.01); *H04W 88/04* (2013.01)

(58) Field of Classification Search
CPC .......... H04M 1/72406; H04M 1/72412; H04B 17/309; H04W 4/024; H04W 4/80; H04W 24/10; H04W 76/14; H04W 84/14; H04W 88/00; H04W 24/02; H04W 88/04; H04W 8/005

See application file for complete search history.

(56) References Cited

U.S. PATENT DOCUMENTS

| | | | | |
|---|---|---|---|---|
| 2012/0281686 | A1* | 11/2012 | Pollari | G06Q 30/0267 370/338 |
| 2015/0312774 | A1* | 10/2015 | Lau | G05D 1/102 455/446 |
| 2016/0112292 | A1* | 4/2016 | Ahuja | H04L 67/1097 709/212 |
| 2018/0184303 | A1* | 6/2018 | Egner | H04W 24/02 |
| 2018/0288626 | A1* | 10/2018 | Abiri | H04W 16/18 |
| 2020/0091988 | A1* | 3/2020 | Zhang | H04B 7/0695 |
| 2021/0328664 | A1* | 10/2021 | Schwab | H04B 7/026 |

* cited by examiner

*Primary Examiner* — Farid Seyedvosoghi
(74) *Attorney, Agent, or Firm* — Sheppard, Mullin, Richter & Hampton LLP; Hector A. Agdeppa; Daniel N. Yannuzzi

(57) ABSTRACT

Systems and methods are provided for effectuating a self-installation application that may be utilized by end users of 5G Fixed Wireless Access (FWA) devices, installation professionals, etc. to optimally locate and position/orient a 5G FWA device relative to an installation environment. Various guidance can be provided to a user depending on the user's level of experience or familiarity with installation of such devices. Calculations can be executed to determine performance of a 5G FWA device depending on its location/position/orientation relative to elements or structures or obstructions that may impact its ability to effectively connect to/obtain service from a serving cell or network infrastructure.

21 Claims, 18 Drawing Sheets

5G FWA DEVICE SELF-INSTALLATION APPLICATION

TECHNICAL FIELD

The present disclosure relates generally to 5G fixed wireless access (FWA) devices, and in particular, to application-based self-installation of 5G FWA devices.

DESCRIPTION OF RELATED ART

Wireless communications have become ubiquitous in today's society, and as wireless systems capabilities increase so does the adoption rate of wireless technologies. Today, wireless technologies are fast overtaking and replacing conventional wired technologies and infrastructure.

5G is a standard promulgated by the International Telecommunication Union (ITU) and the $3^{rd}$ Generation Partnership Project (3GPP), with the ITU setting the minimum requirements for 5G compliance, and the 3GPP creating the corresponding specifications. 5G is a successor to the 4G/Long Term Evolution (LTE) standard and refers to the fifth generation of wireless broadband technology for digital cellular networks. 5G is intended to replace or augment 4G/LTE. Touted advantages of 5G include, e.g., exponentially faster data download and upload speeds, along with much-reduced latency (also referred to as "air latency," i.e., the time it takes for a device to communicate with the network).

The frequency spectrum of 5G includes three bands. The first band can be referred to as the low-band spectrum, i.e., the sub-1 GHz spectrum. This low-band spectrum is the primary band used by U.S. wireless carriers with data speeds reaching about 100 Mbps. The second band can be referred to as the mid-band spectrum, i.e., the sub-6 GHz spectrum, which provides lower latency (e.g., 4-5 ms) and greater data speeds (e.g., up to 1 Gbps) relative to the low-band spectrum. However, mid-band signals are not able to penetrate structures, such as buildings, as effectively as low-band signals. The third band can be referred to as the high-band spectrum, or millimeter wave (mmWave), and operates between 25 GHz and 100 GHz. The term millimeter is associated with this high-band spectrum because wavelengths in this portion of the spectrum range from, e.g., 1-10 mm. Devices operating on this third band can deliver the highest data speed (e.g., up to 10 Gbps) and the lowest latency (e.g., 1 ms). However, its coverage area (the distance it can transfer data) is less than that of the low-band and mid-band spectrums, due in part to poor building penetration. Use of mmWave technology may nevertheless be desirable because the low-band and mid-band portions of the spectrum are already heavily congested with, e.g., TV and radio signals, as well as 4G/LTE traffic, and so long as the limited coverage area is acceptable, the benefits of mmWave technology can still be realized.

BRIEF SUMMARY OF THE DISCLOSURE

In accordance with one embodiment, a mobile device may comprise: a processor, and a memory unit operatively coupled to the processor. The memory unit includes computer code that when executed, causes the processor to: pair the mobile device with a 5G Fixed Wireless Access (FWA) device; provide guidance regarding optimal placement of the 5G FWA device relative to a 5G cell; determine operating characteristics of the 5G FWA device relative to the 5G cell in one or more locations where the 5G FWA device is placed; and present the operating characteristics of the 5G FWA device relative to the 5G cell via the mobile device.

In some embodiments, the computer code that when executed causes the processor to pair the mobile device with the 5G FWA device further comprises computer code that when executed causes the processor to perform the pairing over a short-range wireless communications connection.

In some embodiments, the computer code that when executed causes the processor to pair the mobile device with the 5G FWA device further comprises computer code that when executed causes the processor to perform the pairing over a wired communications connection.

In some embodiments, the computer code that when executed causes the processor to determine the operating characteristics of the 5G FWA device further comprises computer code that when executed causes the processor to obtain from the 5G FWA device, received signal strength measurements obtained by the 5G FWA device. In some embodiments, the computer code that when executed causes the processor to present the operating characteristics of the 5G FWA device further comprises computer code that when executed causes the processor to translate the received signal strength measurements into at least one of visual and auditory indications representative of the received signal strength measurements understandable to a user of the mobile device. In some embodiments, the received signal strength measurements comprise at least one of Reference Signal Received Power (RSRP), Reference Signal Received Quality (RSRQ), and Signal to Interference plus Noise Ratio (SINR) parameters of a reference signal received from the 5G cell.

In some embodiments, the computer code that when executed causes the processor to provide guidance further comprises computer code that presents at least one of visual and auditory indications representative of instructions to at least one of move a location of the 5G FWA device and change an orientation of the 5G FWA device.

In some embodiments, the computer code that when executed causes the processor to present the operating characteristics of the 5G FWA device further comprises computer code that when executed causes the processor to present at least one of visual and auditory indications representative of at least one of performance rating, data upload speed, data download speed, and latency experienced by the 5G FWA device upon connecting to the 5G cell.

In some embodiments, the memory unit includes further computer code that when executed causes the processor to associate the operating characteristics of the 5G FWA device with identifying information identifying each of the one or more locations where the 5G FWA device is placed.

In some embodiments, the 5G cell comprises a 5G small cell base station.

In some embodiments, the memory unit includes further computer code that when executed causes the processor to record information regarding the operating characteristics of the 5G FWA device associated with each of the one or more locations, and present a summary of the operating characteristics of the 5G FWA device associated with each of the one or more location.

In accordance with another embodiment, a method of determining placement of a 5G fixed wireless access (FWA) device may comprise: determining operating characteristics of the 5G FWA device upon connecting to a 5G cell; presenting at least one of visual and auditory representations of the operating characteristics of the 5G FWA device to a user that is at least one of locating and orienting the 5G FWA device relative to a 5G cell providing 5G broadband wireless service, along with at least one of visual and auditory cues guiding the user regarding at least one of a location and orientation resulting in desired operating characteristics of the 5G FWA device upon connecting to the 5G cell.

In some embodiments, the presenting of the at least one of the visual and auditory representations of the operating characteristics and the at least one of the visual and auditory cues occurs via at least one of a display and a speaker implemented on the 5G FWA device.

In some embodiments, the presenting of the at least one of the visual and auditory representations of the operating characteristics and the at least one of the visual and auditory cues occurs via at least one of a display and a speaker implemented on a mobile device. In some embodiments, the method may further comprise undergoing a pairing process to effectuate wireless or wired communications between the mobile device and the 5G FWA device. In some embodiments, the pairing process is effectuated over a short-range wireless communications connection.

In some embodiments, the operating characteristics comprises received signal strength measurements obtained by the 5G FWA device. In some embodiments, the received signal strength measurements comprise at least one of Reference Signal Received Power (RSRP), Reference Signal Received Quality (RSRQ), and Signal to Interference plus Noise Ratio (SINR) values of a reference signal received from the 5G cell.

In some embodiments, the reference signal comprises a 5G high-band mmWave reference signal.

In some embodiments, the operating characteristics comprises at least one of performance rating, data upload speed, data download speed, and latency experienced by the 5G FWA device upon connecting to the 5G cell.

In some embodiments, the 5G cell comprises a 5G small cell base station.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
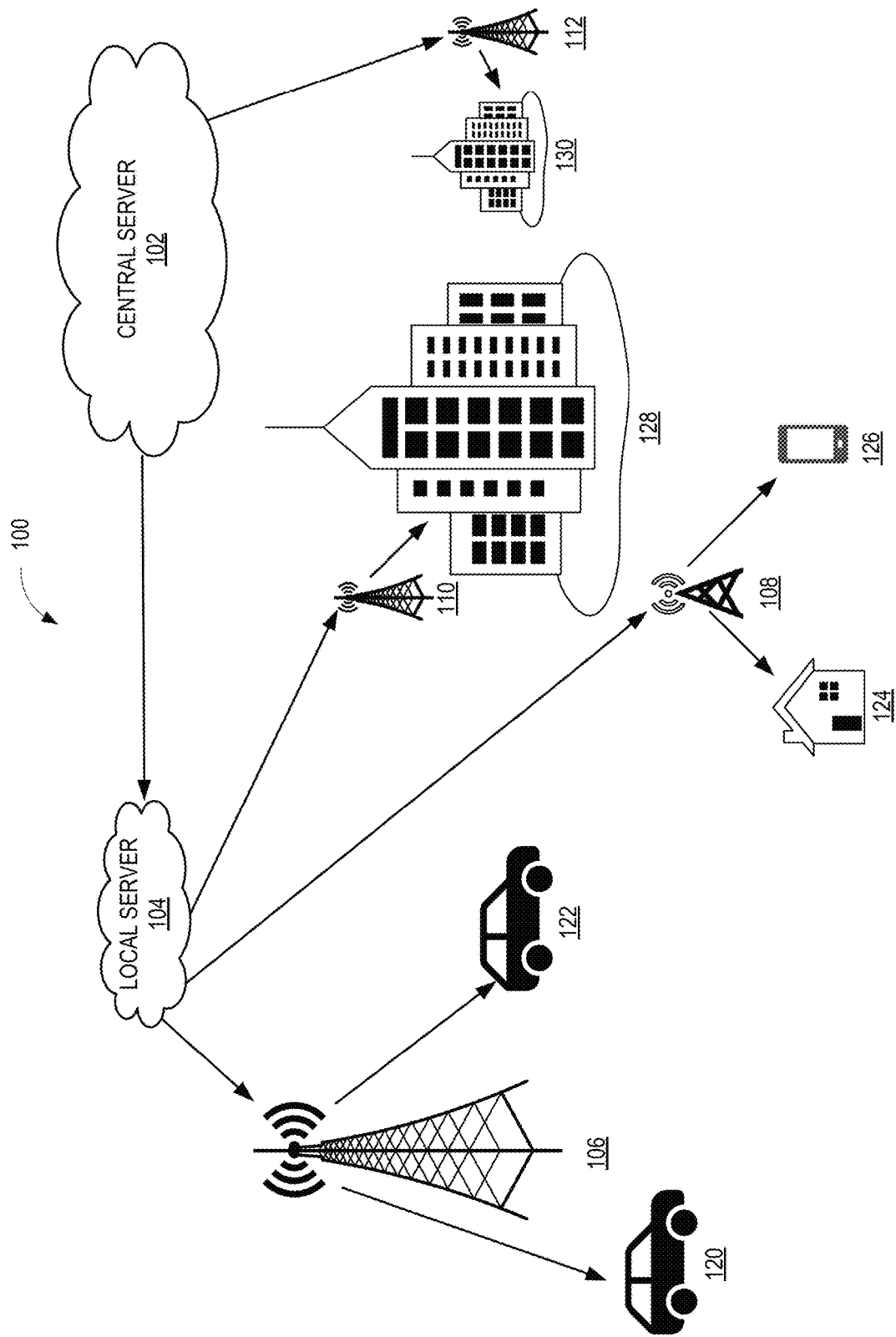
FIG. 1 is a schematic representation of an example 5G network in which various embodiments of the present disclosure may be implemented.

The figures are not exhaustive and do not limit the present disclosure to the precise form disclosed.

DETAILED DESCRIPTION

As alluded to above, 5G technology promises faster data speeds and lower latency. For example, with the promise of data speeds on the order of Gigabits per second (Gbps), despite being a "mobile" standard, 5G technology can offer the possibility of providing, e.g., home broadband services over cellular networks. Fixed Wireless Access (FWA) can refer to a method or process of accessing a communications network or internet via fixed wireless networks. Accordingly, FWA can be used to realize 5G home broadband service over cellular networks.

FWA may be thought of as a type of wireless broadband data communication that is effectuated between two fixed locations that are connected by FWA devices and/or equipment. FWA may be useful in areas where implementing wired broadband access (laying cable/wire) is prohibitively expensive, impractical, etc. especially in densely populated areas. In areas were wired broadband access already exists and/or would be cheap to implement, FWA may still be used to support software-defined networking in a wide area network (SD-WAN) with traffic bursting, as a backup to existing networks, etc.

However, as noted above, the frequency of mmWave signals are so high that they cannot penetrate most building materials, e.g., cement or brick, or is attenuated/reflected so much that its utility is lost (e.g., on the order of above 20-50 dB). Even propagation through air results in signal loss, thereby limiting the efficacy of mmWave to smaller areas as alluded to above. Moreover, mmWave signals have poor multipath propagation. Factors that may compound these issues include, for example, a common desire by end users to place equipment wherever they desire (for convenience, aesthetics, etc.). Additionally, if installation is to be performed by a professional installer/technician, proper installation at the outset (without repeated attempts) results in better perceived customer service, and may cut down on the expense and time associated with subsequent attempts at installation. Thus, proper or optimal location/orientation of a 5G FWA device can be an important factor to the success of using a 5G FWA device.

In accordance with various embodiments, a self-installation application may be provided to users to assist with installation of a 5G FWA device. The self-installation application may provide a convenient user interface by which users are guided through various steps to determine an optimum location/orientation for installing a 5G FWA device. The self-installation application may be executed on a mobile device. The user may traverse one or more areas with the 5G FWA device and the mobile device running the self-installation application. The 5G FWA device may determine signal strength or take/derive other measurements indicative of connection quality to one or more 5G cells with which the 5G FWA device may connect to effectuate wireless broadband service. This information can be relayed to the user by way of the self-installation application so that the user can be made aware of locations/orientations that may be appropriate for installation of the 5G FWA device. Moreover, the self-installation application may run diagnostic tests such as determining signal strength, signal quality, performance rating, actual throughput (upload/download speed) and/or latency associated with such locations/orientations to again, assist a user in determining optimal placement of the 5G FWA device.

It should be understood that some embodiments described herein are presented in the context of an end-user self-installation application. However, the guided installation can also be applied in other contexts and/or for other users. For example, professional installers may leverage the disclosed functionality (or a subset thereof) to facilitate installation of a 5G FWA device on behalf of end-users, such as consumer end-users. That is, a consumer end-user may be presented with more detailed instructions/guiding steps and/or more simplistic instructions, for example. On the other hand, a professional installer may still benefit from location surveying/optimized location/orientation estimations and the like that various embodiments can provide, albeit with less instruction, e.g., less guided steps may be presented, or certain steps can be assumed to be performed by the professional installer, and guided step screens can be skipped or bypassed. In some embodiments, the information/guidance presented by the self-installation application can differ depending on the user.

In some embodiments, the self-installation application may initially request self-identification from a user as either a consumer user or a professional user. In some embodiments, the user may enter a provided code or identifier to inform the self-installation application. In some embodiments, the flow or sequence of guidance/presentation of steps or information can adapt depending on user responses or input. For example, in some embodiments, options may be presented to a user via the self-installation application user interface to bypass or skip certain screens or information. If such options are leveraged, the self-installation application may assume a professional or more experienced user is performing self-installation of a 5G FWA device, and thus, may adapt information/guidance that is presented thereafter.

In some embodiments, the user may determine what location(s)/orientation(s) to try. In some embodiments, the self-installation application may provide at least some direction or guidance, e.g., cues, to the user. Guidance can be provided via graphics, textual cues, audio/visual communications/notifications on one or more devices, e.g., a mobile device, a cloud-based interactive application/mechanism, and the like.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters. In the context of the present disclosure, optimal may be used to describe a location, orientation, or positioning of a 5G FWA device that provides a desired level of service or connection quality. In some embodiments, the optimal location, orientation, or positioning of a 5G FWA device may be realized relative to a threshold for such a level of service or connection quality. In other embodiments the optimal location, orientation, or positioning of a 5G FWA device may be the best out of some set of locations, orientations, or positions.

Before describing the details of the various embodiments contemplated herein, it would be beneficial to describe a 5G network to which the aforementioned 5G FWA device may connect. FIG. 1 illustrates an example 5G network 100 in which or with which various embodiments of the present disclosure may be implemented. A mobile network can be thought of as comprising two component networks, the Radio Access Network (RAN) and the core network.

A mobile network's RAN may include various infrastructure, e.g., base stations/cell towers, masts, in-home/in-building infrastructure, and the like. The RAN allows users of mobile devices (also referred to as User Equipment (UE), e.g., smartphones, tablet computers, laptops, vehicle-implemented communication devices (e.g., vehicles having vehicle-to-vehicle (V2V) capabilities), to connect to the core network. FIG. 1 illustrates a plurality of 5G small base stations or small cells and 5G macro base stations or macro cells, i.e., 5G macro cells 106, 110, and 223, and 5G small cell 108.

Macro cells can refer to (tall, high-powered) "macro" base stations/cell towers that are able to maintain network signal strength across long/large distances. 5G macro cells may use Multiple Input, Multiple Output (MIMO) antennas that may have various components that allow data to be sent and/or received simultaneously. In the example 5G network 100 of FIG. 1, 5G macro cell 106 may provide wireless broadband coverage/communications to vehicles 120 and 122. 5G macro cell 110 may provide broadband service to an area, such as a city or municipality 128. Likewise, 5G macro cell 112 may provide broadband coverage to an area, such as a city or municipality 130. The MIMO antennas used by 5G macro cells may comprise large numbers of antenna elements, which can be referred to as massive MIMO, whose size may be comparable to, e.g., 3G and/or 4G base station antennas.

5G small cells can refer to wireless transmitters/receivers implemented as micro base stations designed to provide coverage to areas smaller than those afforded coverage by 5G macro cells, e.g., on the order of about 100 m to 200 m for outdoor 5G small cells. Indoor 5G small cell deployments may provide coverage on the order about 10 m. 5G small cells can be mounted or integrated into/onto streetlights, utility poles, buildings, etc., and like 5G macro cells, may also leverage massive MIMO antennas. In the example 5G network 100 of FIG. 1, 5G small cell 108 provides broadband coverage to house 124 and smartphone 126.

The core network may comprise the mobile exchange and data network used to manage the connections made to/from/via the RAN. As illustrated in FIG. 1, the core network of 5G network 100 may include central server 102 and local server 104. Central server 102 is shown to effectuate broadband service to area 130 by way of 5G macro cell 112. Central server 102 may also operatively connect to local server 104, which in turn, provides broadband connectivity by way of 5G macro cells 106 and 110, as well as 5G small cell 108. The use of distributed servers, such as local server 104 can improve response times, thereby reducing latency. The core network may leverage network function virtualization (instantiation of network functions using virtual machines via the cloud rather than hardware) and network slicing (segmentation of 5G network 100 in accordance with a particular application, industry, or other criteria) to provide these lower response times, and provide faster connectivity.

Figure 2:
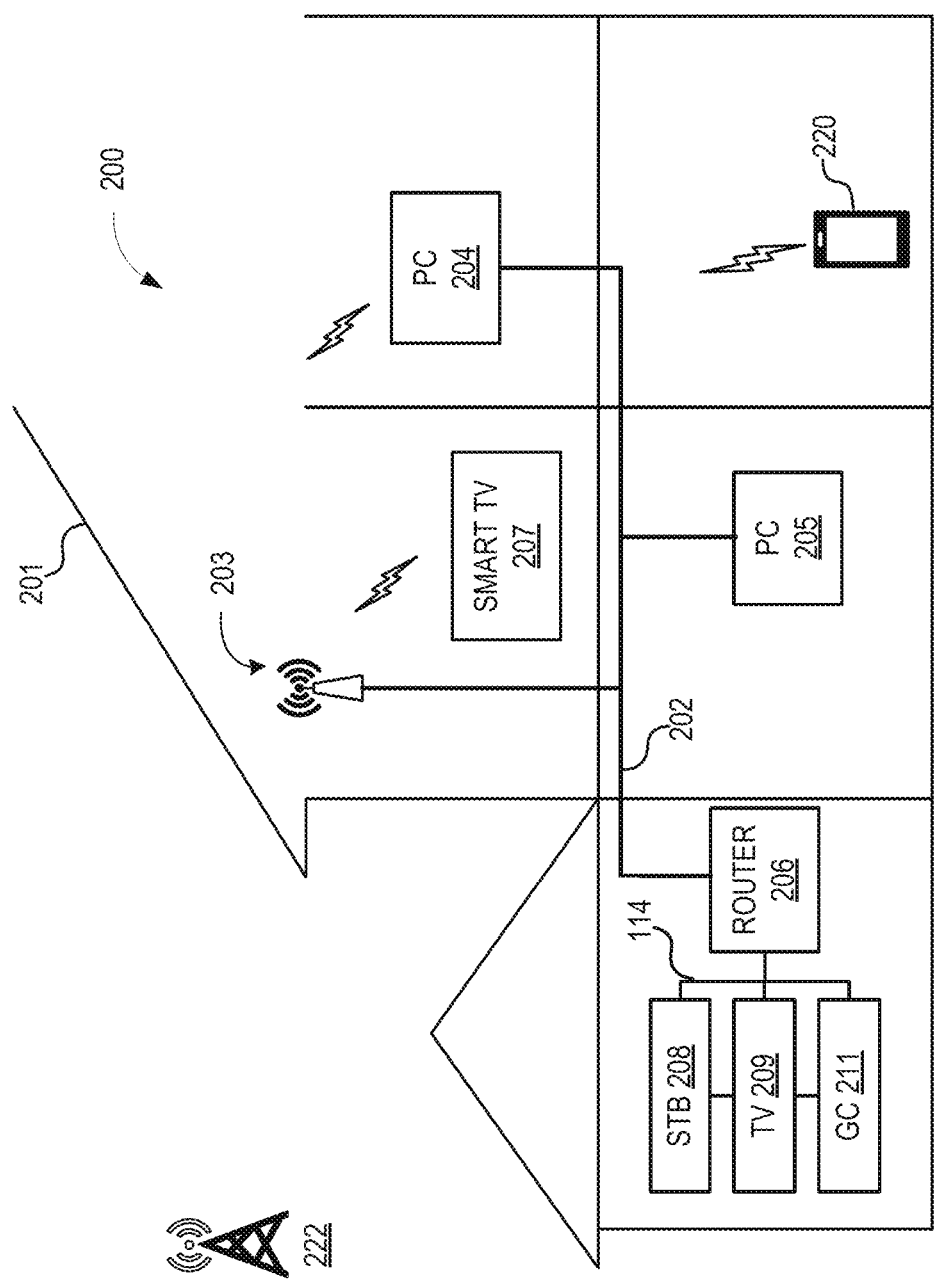
FIG. 2 illustrates an example structure in which a 5G FWA device may be installed in accordance with various embodiments of the present disclosure.

FIG. 2 illustrates an example of an in-home wireless and wired network 200 with which various embodiments may be implemented. The example of FIG. 2 shows a wired and wireless network 200 operating within a building 201. Building 201 may be a house, an apartment, an office suite or building, a warehouse, a retail establishment or other commercial, residential or government building.

FIG. 2 illustrates a wired network implemented using a wired communications medium 202. In some embodiments, the wired communications medium 202 may be a fiber optic cable system, an Ethernet cable system, a coaxial cable system, a power line system, or other physical communications medium. A wireless access point 203 is included in this example to provide a wireless network over which various devices within the building 201 may communicate wirelessly. For example, wireless access point 203 can function as a Wi-Fi router to create a Wi-Fi network over which the various devices can communicate. In this example, wireless access point 203 also includes a router so that it can communicate over wired communications medium 202.

FIG. 2 also illustrates a number of devices that can communicate wirelessly or over wired communications medium 202 as devices on the network 200. This example includes a smart phone 220, a smart TV 207, and personal computers (PCs) 204 and 205 that can communicate wirelessly with wireless access point 203, for example. Additionally, FIG. 2 illustrates a router 206 that can communicate with wireless access point 203 via wired communications medium 202. Router 206 can further communicate with a set-top box 208, a television 209, and a gaming console 211 via a wired communications interface (not shown).

In some implementations, wireless access point 203 may be implemented as a Wi-Fi router for communications with devices within or within some proximity of the outside of building 201. Although various embodiments may be described in terms of this example environment, the technology disclosed herein can be implemented in any of a number of different environments.

FIG. 2 also illustrates an example 5G small cell 222 capable of providing 5G broadband service/coverage to building 201. In order for a user in building 201 to avail him/herself of 5G broadband service, the user may wish to install a 5G FWA device somewhere inside or outside (and proximate to) building 201. In order to achieve optimal placement of such a 5G FWA device, an application may be used by a user to help him/her find that optimal placement. As alluded to above, that application may be executed on a mobile device, e.g., smart phone, operated by the user.

Figure 3:
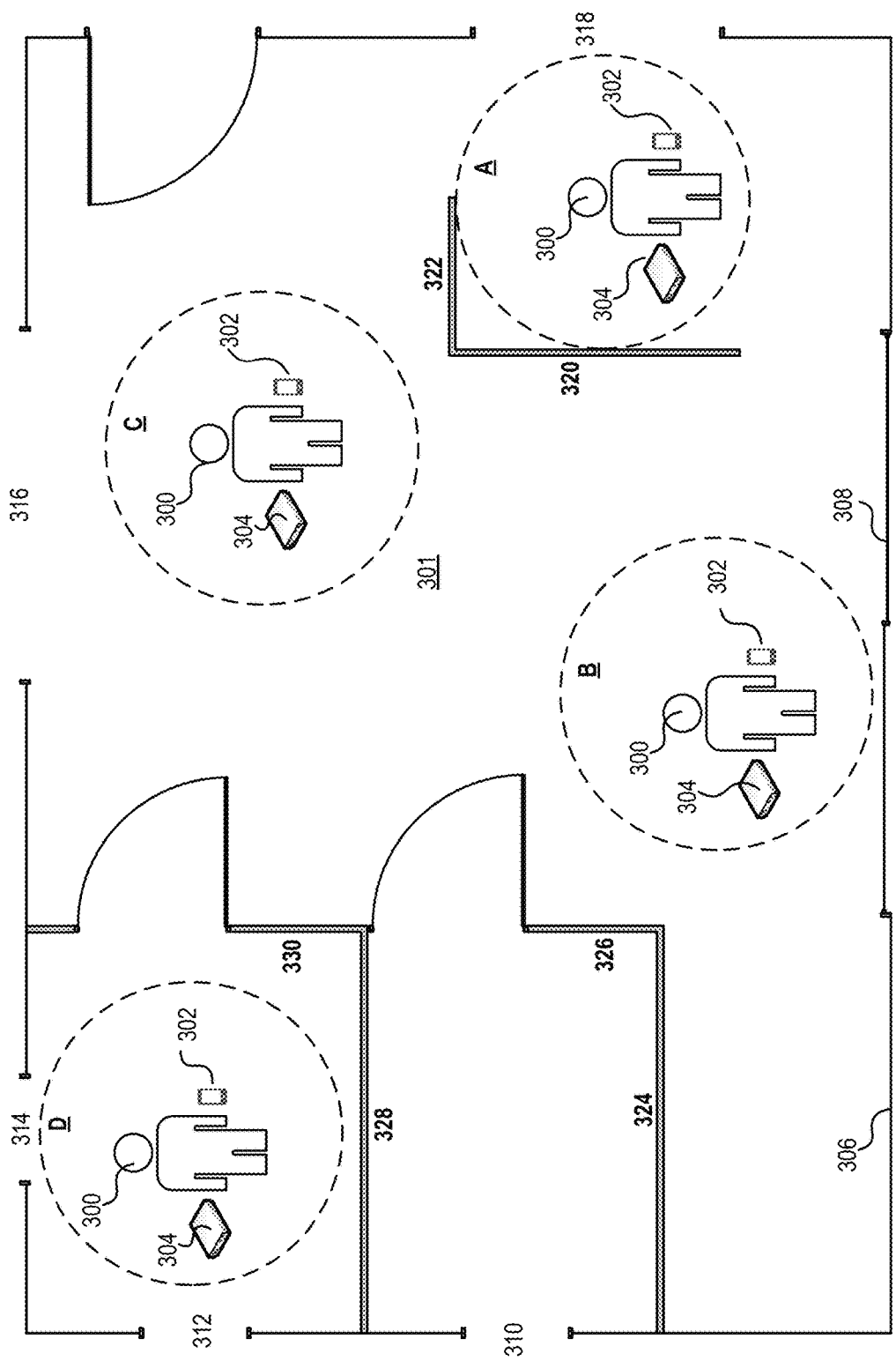
FIG. 3 is a schematic representation of an example 5G FWA device operatively communicating with a 5G smart cell and mobile device for effectuating self-installation in accordance with one embodiment of the present disclosure.
Figure 3:

Referring now to FIG. 3, a floorplan of a structure 301 is illustrated, where similar to structure 201, structure 301 may be a house, apartment, residential, commercial, government, or other building or facility in which a user may wish to install a 5G FWA device to receive 5G broadband service therein or proximate thereto. As will be described in greater detail below, a user may execute a self-installation application on his/her mobile device 302, where the mobile 302 can be communicatively linked or paired to a 5G FWA device 304 to be installed somewhere about floorplan 301. 5G broadband coverage may be achieved by 5G FWA device 304 upon being operatively connected to a 5G small cell 340.

As described above, when relying on a 5G small cell to achieve 5G broadband coverage, the location and orientation of a 5G FWA device relative to the 5G small cell is an important consideration because mmWave and high-band sub-6 GHz signals are significantly attenuated by wall and window materials, may experience air loss, etc. In accordance with various embodiments, the self-installation application relay information from 5G FWA device 304 to user 300 so that user 300 can determine, with assistance from the self-installation application, optimal placement of 5G FWA device 304. As illustrated in FIG. 3, user 300 may traverse structure 301 with both mobile device 302 and 5G FWA device 304. As the user traverses different areas within or about structure 301, the self-installation application running on mobile device 302 can present information such as signal strength, may run diagnostic tests, such as performance rating, upload speed, download speed, and/or latency times associated with locating and/or orienting 5G FWA device 304 in a particular area.

As an example, FIG. 3 illustrates user 300 in a first location "A" between outer wall 306 of structure 301 and interior walls 320 and 322, and proximate to a window 318. At this location A, user 300 may command the self-installation application running on mobile device 302 to initiate (or it may automatically initiate) testing to determine the quality of the 5G broadband coverage received or experienced by 5G FWA device 304 at that location from 5G small cell 340.

For example, 5G FWA device 304 may attempt to initiate a connection to 5G small cell 340. It should be noted that 5G FWA device 304 may first undergo an authentication and/or authorization process with 5G small cell 340. Thereafter, 5G FWA device 304 may begin receiving signals from 5G small cell 340, and the 5G FWA device 304 can begin measuring the strength of the signals being received. In some embodiments, signal strength can be measured in dBm. A wireless receiver of the 5G FWA device 304 may receive such signals via an antenna, and determine the associated signal strength.

For example, 5G FWA device 304 may measure the Reference Signal Received Power (RSRP) Reference Signal Received Quality (RSRQ), Signal to Interference Plus Noise Ratio (SINR) parameters of a reference signal from 5G small cell 340. The signal strength can be translated into and presented as a graphical indication that the user may understand, e.g., graphical bars or other indications reflecting an approximate representation of signal strength. Such graphical indications can be presented by way of the self-installation application running on mobile device 302.

Additionally, the self-installation application may further perform diagnostics, e.g., determine upload speeds, download speeds, latency, and/or qualitative performance rating. One skilled in the art would understand how to implement the requisite functionality on 5G FWA device 304. This information could also be graphically or visually presented to the user via the self-installation application. In this way, the user can be made aware of any information relevant to the strength of the signal(s) received from 5G small cell 340, and the user can understand the relative strength/weakness of locating/orienting 5G FWA device 304 in that particular area. For example, in a Non-Standalone (NSA) 4G/5G RAN, a 5G FWA device, such as 5G FW 304, may ping a 5G small cell (also referred to as next generation NodeB (gNB)), and initially lock onto the 4G Long-Term Evolution (LTE) network for signaling information. It should be noted that 4G and 5G services may co-exist, e.g., 4G base stations/cells may be present in the same/nearby geographical area(s) in which 5G service is provided. If 5G network capacity is available, and there is a request for high throughput data, the data will be sent over the 5G network. The 5G FWA device and/or the self-installation application via the 5G FWA device will assess the 5G signal characteristics, and make a quantitative determination to translate the 5G signal characteristics into an appropriate number of representative signal bars (e.g., one to five bars) to display within the self-installation application. In some embodiments, the self-installation application may also display a performance rating (e.g., a value from one to four) for more precise, signal strength quality and performance representation in one location/orientation relative to another.

As described herein, location and orientation can both be taken into account when considering optimal positioning of a 5G FWA device relative to a 5G small cell/gNB. Accordingly, in some embodiments, the self-installation application may, e.g., by audible prompts or signals, visual prompts or signals, or some other type of prompt/signal or combination thereof, inform the user of the relative performance differences and/or suggestions regarding location and/or orientation of a 5G FWA device. In other embodiments, a user may be directed through other directions/notifications (e.g., separate documentation) to position the 5G FWA device in different locations/orientations at a particular location. In some embodiments, resident navigational functionality (GPS, compass, etc.) of a mobile device may be used by the self-installation application to determine location/orientation. In some embodiments, potential locations/orientations may be presented on a graphical map along with associated predicted/estimated performance ratings at those locations/orientations. For example, a user may be directed to position the mobile device on which the self-installation application is running near the 5G FWA device, and point or orient the mobile device in a particular direction that is indicative/representative of the direction/orientation in which, e.g., a front face of the 5G FWA device is directed/oriented to achieve a "baseline" orientation. In some embodiments, location-based functionality may be implemented and leveraged in the 5G FWA device itself. It should be understood that these are examples and not meant to be limiting.

As further illustrated in FIG. 3, user 300 may explore other areas for the potential placement of 5G FWA device 304, for example: location B, proximate to sliding glass door 308 and within a generally "open" area near the center of structure 301; location C, proximate to window 316, but north of location B; and location D in a room bounded by outer wall 306, interior walls 328, 330 with windows 312, 314 along outer wall 306. It should be noted that while some examples discussed herein refer to indoor locations, embodiments can be used or applied for outdoor installations as well, e.g., on a roof, along an external periphery of a building, etc. In such scenarios, outdoor obstructions or elements may be considered when determining preferred/optimal location/placement/orientation of 5G FWA device 304, e.g., leaves, trees, branches, other structures, etc. It should be appreciated that the signal strength of signals from 5G small cell 340 received by 5G FWA device 304 depending on its location/orientation within/proximate to structure 301 can vary based on the presence of windows, walls, doors, the thicknesses/materials thereof, line of sight angle, etc. For example, it can be appreciated that the received signal strength at location A will likely be less optimal than that at location D due to location A having interior walls (320 and/or 322), wall 330, and outer wall 306 that signals must pass through. This is in contrast to location D, where signals may only have to pass through outer wall 306, and possibly only through one of windows 312 or 314.

Figure 4A:
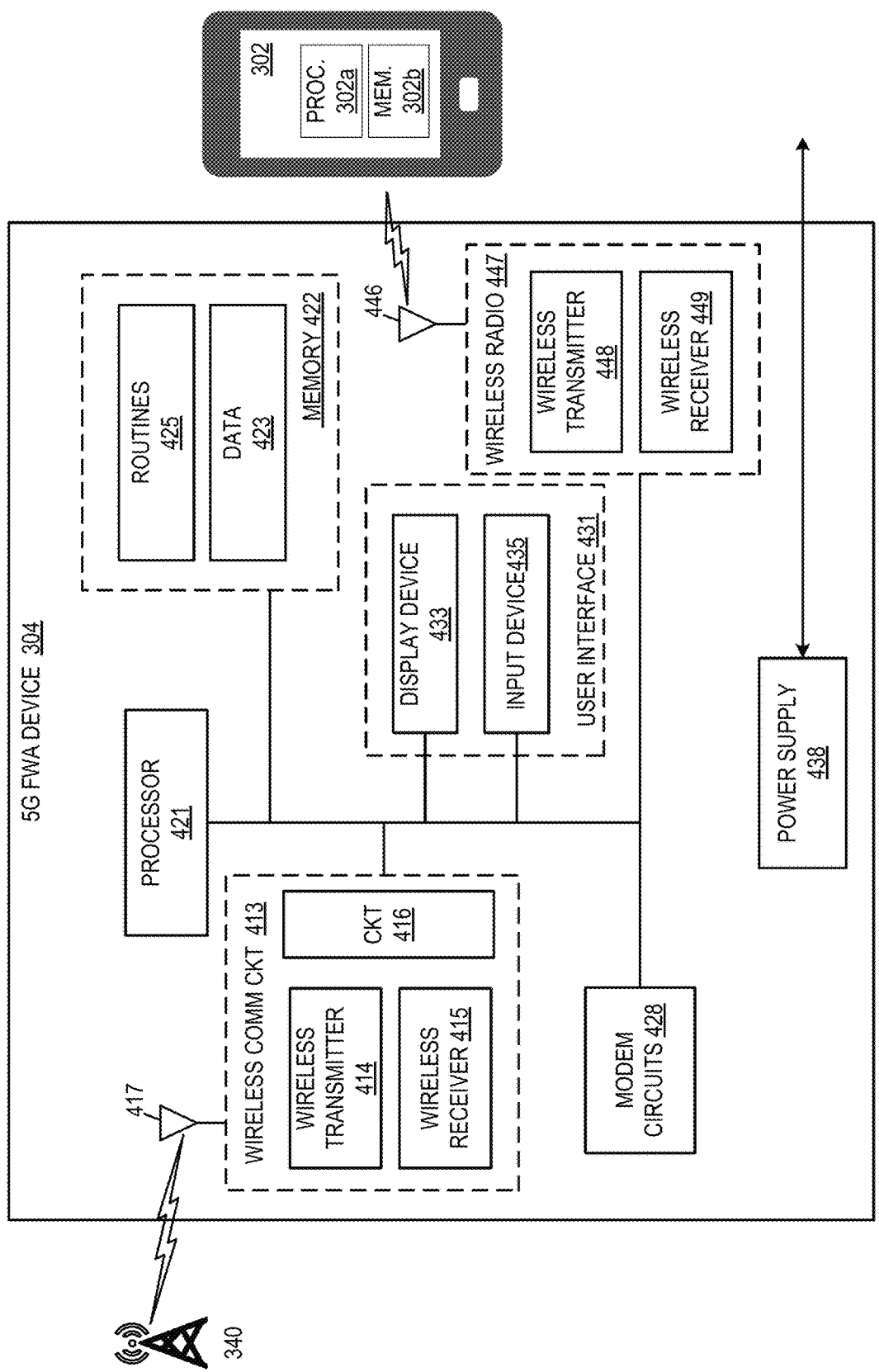
FIG. 4A illustrates a schematic representation of an example 5G FWA device in communication with a mobile device.

FIG. 4A is an example schematic representation of 5G FWA device 304 that exchanges data, e.g., signal strength information, with mobile device 302. It should be understood that mobile device 302 may have a processor 302a and a memory unit 302b with which a self-installation application can be implemented in accordance with various embodiments.

This example of 5G FWA device 304 includes a processor 421, memory 422, modem circuits 428, power supply circuits 438, and a 5G wireless communication circuit 413. In some embodiments, 5G FWA device 304 may also include user interfaces in the form of a display device 433 and an input device 435. In some embodiments, 5G FWA device 304 may be adapted to store the above-described self-installation application in memory 422, and a processor 421 may execute the self-installation application. In this way, the need to use mobile device 302 as a mechanism for relaying data, e.g., signal strength data, between 5G FWA device 304 and user 300, may be negated. For example, user 300 may traverse one or more areas of structure 301 with only 5G FWA device 304, where 5G FWA device 304 internally executes the self-installation application, and provides the requisite signal strength information, diagnostic information directly to user 300.

Processor 421 may be implemented as a dedicated or general-purpose processor or combination of processors or computing devices to carry out instructions and process data. For example, processor 421 accesses memory 422 to carry out instructions, including routines 425, using data including data 423. For example, routines 425 may include routines to measure received signal strength of signals received from 5G FWA device 304 and/or run diagnostics, such as determining upload/download speeds and latency, or assigning a performance rating based on multiple signal/channel parameters. That information may be stored as data/as part of data 423. In some embodiments, routines 425 may include routines to automatically and periodically perform such measurements and/run such diagnostics. Routines 425 may include routines for responding to commands/instructions received from the self-installation application regarding when to initiate measuring of received signal strength. In some embodiments, routines 425 may include routines to transfer such received signal strength measurement information to wireless radio 447 to be transmitted to the self-installation application running on mobile device 302. In an embodiment where the self-installation application is executing on 5G FWA device 304, routines 425 may comprise routines for transferring, e.g., received signal strength information and/or processing such received signal strength information into visual and/or auditory data that can be presented to user 300 via user interface 431. In such embodiments, user 300 may input certain information and/or commands via user interface 431, wherein some or more of the input information and/or commands may be sent to memory 422 and used/incorporated into routines 425 for controlling or managing one or more operational aspects of 5G FWA device 304. In some embodiments, routines 425 may include routines effectuating operative connectivity and interactions with self-installation application running on mobile device 302 or running on 5G FWA device 304 itself. For example, the self-installation application may require user 300 to scan a code, e.g., a QR code, or input identification information associated with 5G FWA device 304. In some embodiments, routines 425 may include routines for periodically or aperiodically saving measurement and/or diagnostic information as a log, cache, buffering such information, etc.

Processor 421 may include one or more single core, dual core, quad core or other multi-core processors. Processor 421 may be implemented using any processor or logic device, such as a Complex Instruction Set Computer (CISC) microprocessor, a Reduced Instruction Set Computing (RISC) microprocessor, a Very Long Instruction Word (VLIW) microprocessor, a processor implementing a combination of instruction sets, or other processing device. Other modem circuits 428 may be provided to perform other modem functions.

Memory 422 includes memory locations for storing instructions or other routines 425 and data 423. Memory 422 may be implemented using any machine-readable or computer-readable media to store data and instructions, including volatile and nonvolatile memory. Memory may be implemented, for example, as Read-Only Memory (ROM), Random-Access Memory (RAM), Dynamic RAM (DRAM), Double-Data-Rate DRAM (DDRAM), Synchronous DRAM (SDRAM), Static RAM (SRAM), Programmable ROM (PROM), Erasable Programmable ROM (EPROM), Electrically Erasable Programmable ROM (EEPROM), flash memory or other solid state memory, polymer memory, ferroelectric memory, Silicon-Oxide-Nitride-Oxide-Silicon (SONOS) memory, holographic or other optical storage, or other memory structures. Although memory 422 is illustrated as a separate component in FIG. 6, part or all of memory 422 can be implemented on the same integrated circuit as processor 421 or otherwise form part or all of embedded memory of processor 421.

Wireless communication circuit 413 includes a wireless transmitter 414, a wireless receiver 415, communication circuitry 416 and antenna 417. Communication circuitry 416 may be implemented as a communications processor using any suitable processor logic device to provide appropriate communications operations such as, for example, baseband processing, modulation and demodulation, and other wireless communication operations. Where certain operations such as modulation and demodulation are performed in the digital domain, analog-to-digital and digital-to-analog conversion circuitry can be included to provide the appropriate interfaces between communication circuitry 416 and wireless transmitter 414 and wireless receiver 415.

In this example, wireless radio 447 that includes a wireless transmitter 448, a wireless receiver 449, antenna 446, and associated circuitry allows for wireless communications between 5G FWA device 304 and mobile device 302 over Wi-Fi. In some embodiments, wireless radio 447 may include or alternatively comprise other wireless communication mechanisms, e.g., the requisite circuitry/componentry that allow for Bluetooth® communications, Near Field Communications (NFC), Zigbee, other short-range communications, or wired communications between 5G FWA device 304 and mobile device 302.

Wireless radio 447 may, for example, receive signal strength information from wireless communications circuit 413 (by way of 5G FWA device 304's connection to 5G small cell 340), which it can transmit via wireless transmitter 448 to mobile device 302, where the self-installation application running on mobile device 302 may modify, translate, and/or otherwise present that information in the form of signal strength data/graphics, performance rating, upload/download speeds, and/or latency information.

In the event 5G FWA device 304 incorporates user interface 431 (whether for allowing user 300 the ability to interact with 5G FWA device 304 for signal strength testing purposes, configuration/troubleshooting purposes, etc.), user interface 431 in this example, may include a display device 433 and an input device 435. Display device may include, for example, one or more LEDs; display screens, touch screens, or other alphanumeric displays, or other display devices to communicate data or other information to a user. Input device 435 may include buttons, a keypad, a touch-screen display, or other input device to accept input from a user. For example, in some embodiments, voice commands from user 300 may be used to control the self-installation application (if being executed on 5G FWA device 304), and/or audio prompts or other information regarding, e.g., information that might otherwise (or in addition) be presented visually, can be provided to user 300. Display device 433 and input device 435 may include attendant circuitry such as drivers, receivers and processing or control circuitry to enable operation of the devices with 5G FWA device 304.

Power supply circuit 438 can be included to provide power conditioning or power conversion for components of 5G FWA device 304. For example, power supply can supply power to different components of 5G FWA device 304 at specific voltage and current levels appropriate for those components. Power supply circuit 438 in this example, may receive power from a wired or wireless power source operatively connected to 5G FWA device 304. In some embodiments power supply 438 may be a battery power supply. In some embodiments, power supply 438 may be Power-over-Ethernet (PoE), where power can be carried over Ethernet wires (IEEE 802.3bt), where in some embodiments a PoE power injector can be built into a connected router/gateway, or can be a separate component with an AC adaptor that can be connected to the building mains. As alluded to above, user 300 may traverse one or more areas of structure 301 to determine received signal strength at 5G FWA device 304. Accordingly, 5G FWA device 304 must be powered on and operative. Therefore, user 300 may connect an external power supply, such as an external battery pack (not shown in FIG. 4). Alternatively, 5G FWA device 304 may be connected to a power outlet (not shown in FIG. 4) of structure 301, for example, and user 300 may be able to traverse certain areas while 5G FWA device 304 is plugged in to such a power outlet.

Figure 4B:
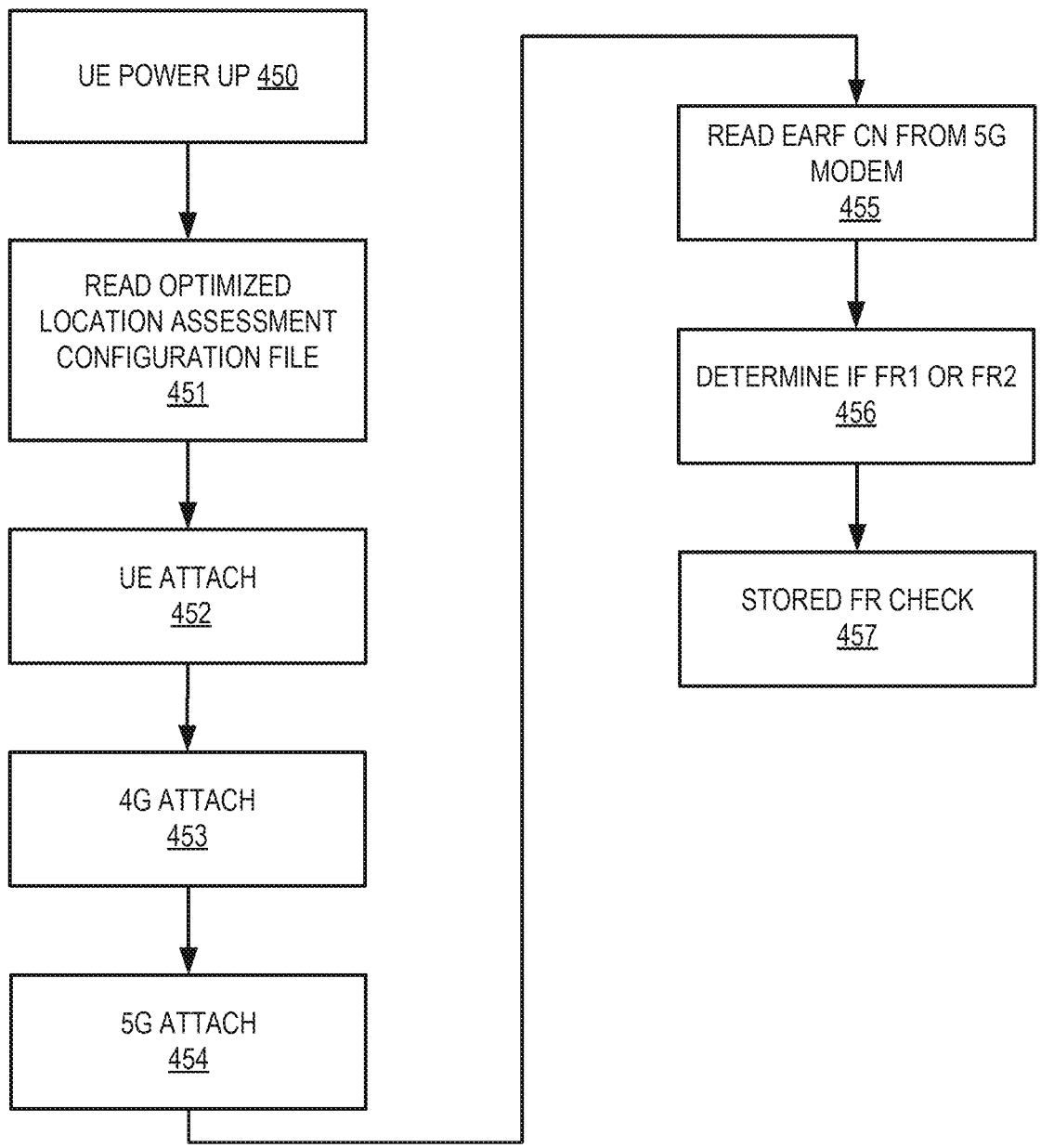
FIG. 4B is a flow chart illustrating example FWA device start-up operations.

FIG. 4B illustrates example operations that may be performed during User Equipment (UE), e.g., FWA device 304) startup. At operation 450, the UE may power up. At operation 451, an optimized location assessment configuration file may be read, where the configuration file can be stored on mobile device 302 or otherwise accessible from an appropriate source, that contains relevant parameters and/or thresholds for performing the assessment. Examples of such relevant parameters can include, but is not limited to, moving average window, sampling rate, standard deviation regarding various radio technologies, along with peak variations, beam switching frequency, channel switching frequency, etc. At operations 452, 453, and 454, attach procedures may be performed, e.g., UE attach, 4G attach, and 5G attach, where mobile equipment ID of the mobile device 302 is obtained, perhaps passed to a home subscriber server, transmitting an attach request to a cell, and so on, to effectuate operative connection of mobile device 302 to wireless networks, e.g., 4G and 5G networks. At operation 455, the E-UTRA Absolute Radio Frequency (EARF) Channel Number (CN) is read from the 5G modem, in this case, 5G FWA device 304, and at operation 456, a check is performed to determine what Frequency Range (FR) the mobile device is using (FR1 or FR2). It should be understood that 5G uses a radio access technology (RAT) developed for 5G networks, and uses two FRs, (FR1 including sub-6 GHz frequency bands, and FR2 which includes frequency bands in the mmWave range). At operation 457, the determined frequency range is stored.

Figure 4C:
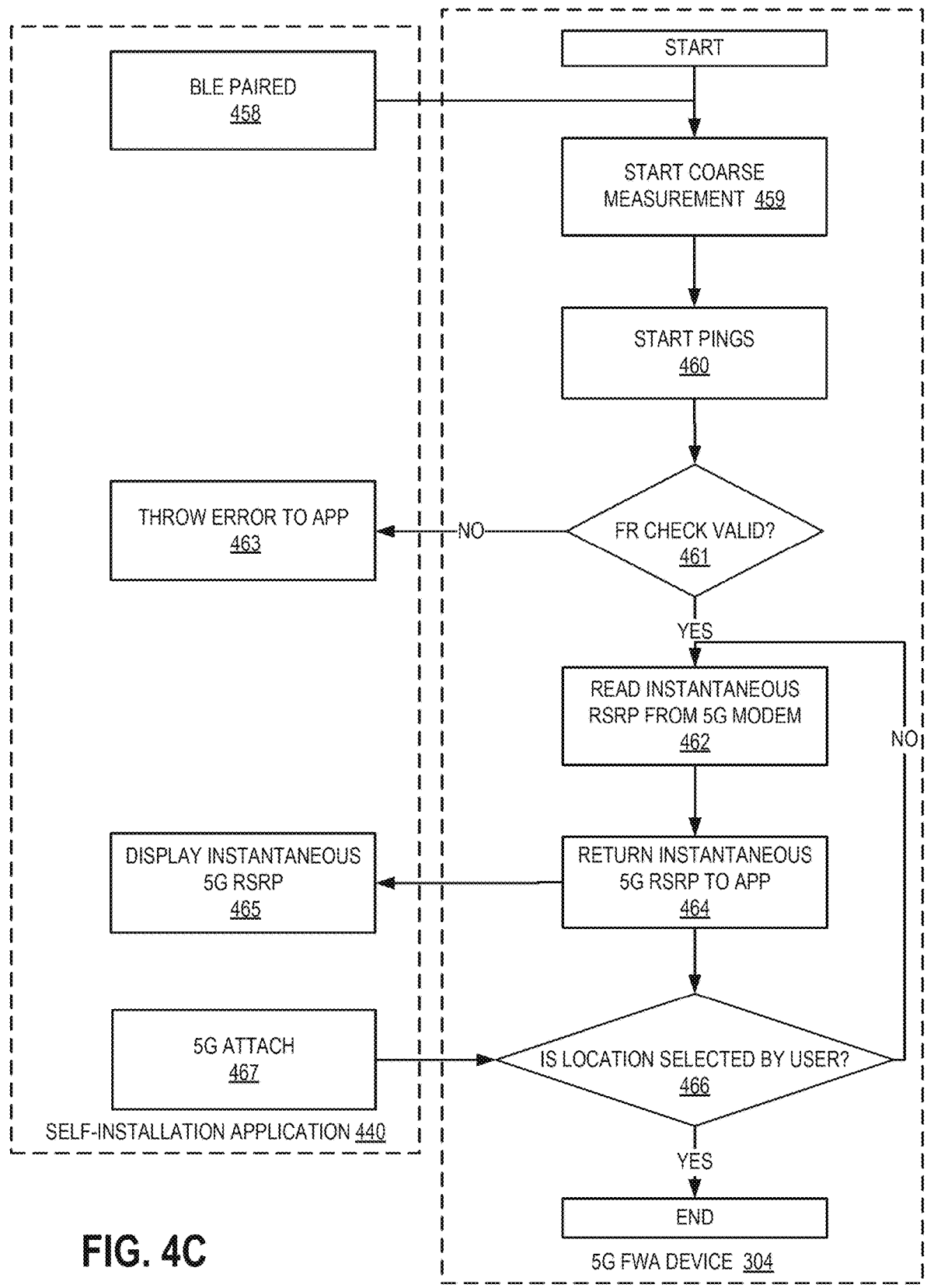
FIG. 4C is a flow chart illustrating example operations performed during a coarse measurement phase in accordance with one embodiment of the present disclosure.
Figure 4D:
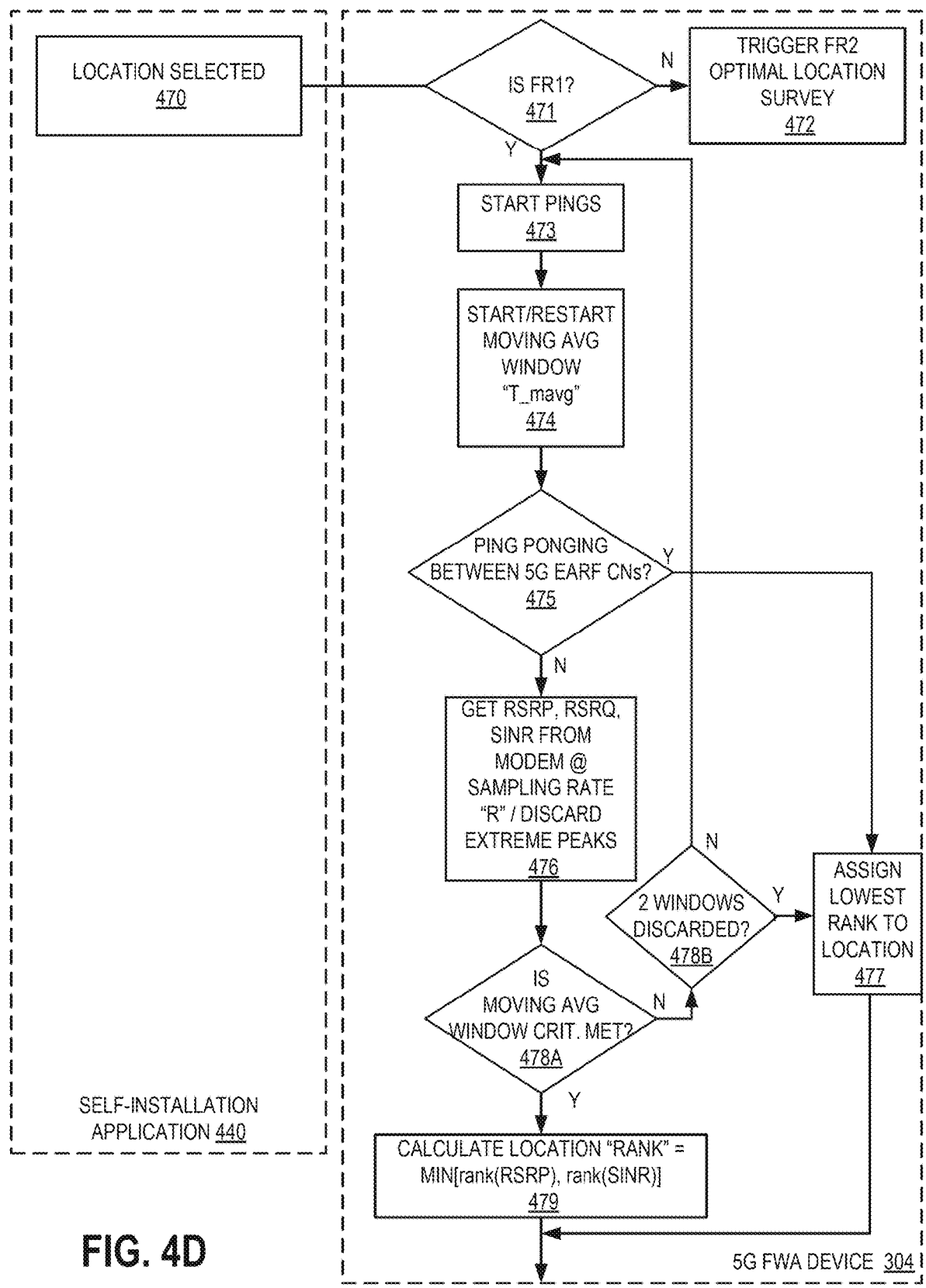
FIG. 4D is a flow chart illustrating example operations performed during a first frequency range fine measurement phase in accordance with one embodiment of the present disclosure.
Figure 4E:
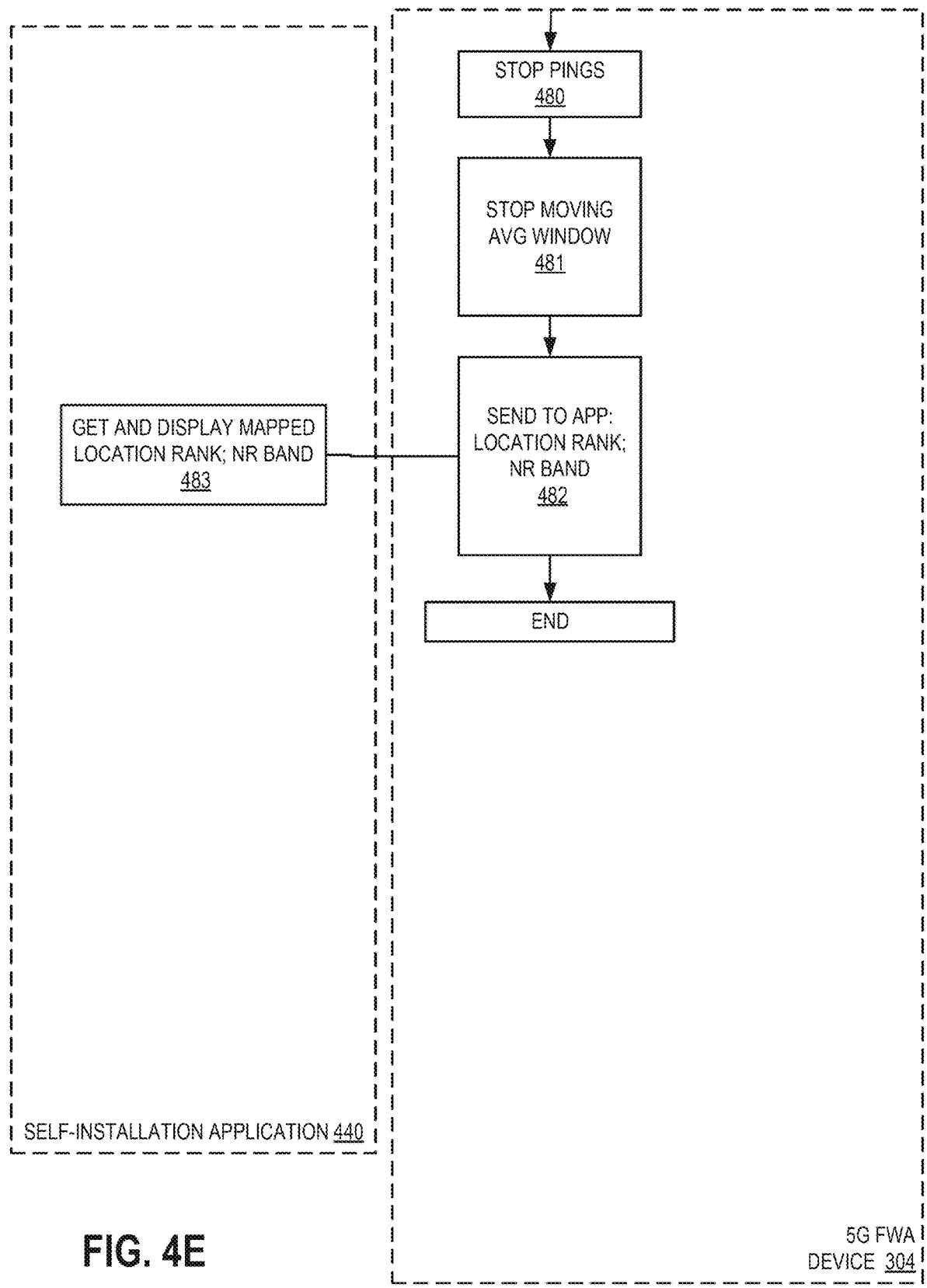
FIG. 4E is a continuation of the flow chart of FIG. 4D.

FIG. 4C illustrates example operations that may be performed during a coarse signal strength measurement phase. At operation 458, Bluetooth® Low Energy (BLE), for example, pairing may be performed at which point, coarse measurement of signal strength may begin at operation 459. At operation 460, 5G FWA device 304 may start pinging 5G small cell 222, and at operation 461 determine if the EARFCN of the 5G FWA device 304 is camped on belongs to a valid 5G NR frequency range. If so, an instantaneous RSRP measurement can be read at operation 462, and if not, an error can be thrown to the self-installation app 440 at operation 463. Upon reading the instantaneous RSRP at operation 462, it can be returned to the self-installation application 440 at operation 464, at which point, the instantaneous RSRP measurement can also be displayed to a user via the self-installation application 440 at operation 465. Upon attaching to 5G cell 222 (or whichever cell mobile device 302 attaches to) at 467 (similar to operation 454), a check can be performed to determine if the user of mobile device 304/self-installation application 440 has selected a location at operation 466 at which 5G FWA device 304 is to be placed. FIGS. 4D and 4E illustrate example operations that may be performed during a fine measurement phase in a first frequency range (e.g., which can correspond to FR1). At operation 470, upon selection of a location, a check is performed to determine whether the frequency range in use is FR1 at operation 471. If not, an FR2 optimized location assessment may be triggered at operation 472 (and fine-grained measurement of the FR2 frequency range can commence (described below at FIGS. 4F and 4G). If so, 5G FWA device 304 may begin pinging the cell/BS to which it is attached at operation 473. At operation 474, a moving average window of length (duration) T_mavg is started/restarted. RSRP and SINR can be sampled at a sampling rate of "R" Hz within this window, and RSRP and SINR averages are calculated within this window as well. Extreme peaks for SINR and RSRP can be discarded during the averaging process. A window with a high standard deviation, or a high channel switch frequency can be discarded.

At operation 475, a check for ping ponging between 5G EARF CNs is performed, e.g., when a device/user equipment switches between networks attaches to different 5G EARF CNs and/or due to device/user equipment handovers between multiple 5G EARF CNs. If the ping pong effect is occurring, at operation 477, a lowest rank is assigned to the location. At operation 476, the RSRP, RSRQ, and SINR measurements are obtained from the modem of 5G FWA device 304 at a given sampling rate and extreme peak measurements are discarded (to rid, e.g., anomalous measurements, from the dataset comprising signal strength measurements). For example, the SINR/RSRP measurement or reading can be discarded if SINR_current−SINR_previous>±V_sinrFR1 and/or RSRP_current−RSRP_previous>±V_rsrpFR1, where V refers to a constants value.

At operation 478A, a check is performed to determine if the moving average window criteria is met. In particular, a moving average window may be discarded, and a new one started if standard deviation (SD)_mavgwin_SINR>SD_sinrFR1 AND SD_mavgwin_RSRP>SD_rsrpFR1. A moving average window may also be discarded if the 5G EARFCN switch frequency exceeds a threshold i.e., f_5gearfcn>=F_5GEARFCN. It should be noted that if more than two moving average windows are discarded (checked at operation 478B), the lowest RF ranking can be assigned to the corresponding location. Likewise, if ping ponging occurs between 5G EARF CNs within a moving average window, the lowest RF rank can be assigned to this location. It should be noted that if there are multiple locations/orientations "tied" as having the same RF rank, the location with the higher average RSRP is ranked higher. It should also be understood that different ways of ranking, breaking ranking ties, etc. may be implemented. For example, different metrics/criteria for breaking ties between measured RF characteristics can be applied to different rankings ties. For example, lowest RF rank ties may be broken using a first tie-break metric, whereas a highest RF rank tie may be broken using a second tie-break metric. One of ordinary skill in the art would understand how to perform such tie-breaks, and when to implement such tie-breaks.

At operation 479, if the moving average window criteria is met at operation 478, a location "rank" (which in some embodiments can equate to MIN[rank(RSRP), rank(SINR)]) can be calculated. As illustrated in FIG. 4E, at operation 480, the pinging of the cell(s) can stop, the moving average window can be stopped at operation 481, and location rank and new radio (NR) band information can be sent to self-installation application 440 at operation 482, where this information can be obtained and displayed by self-installation application 440 to a user at operation 483.

Figure 4F:
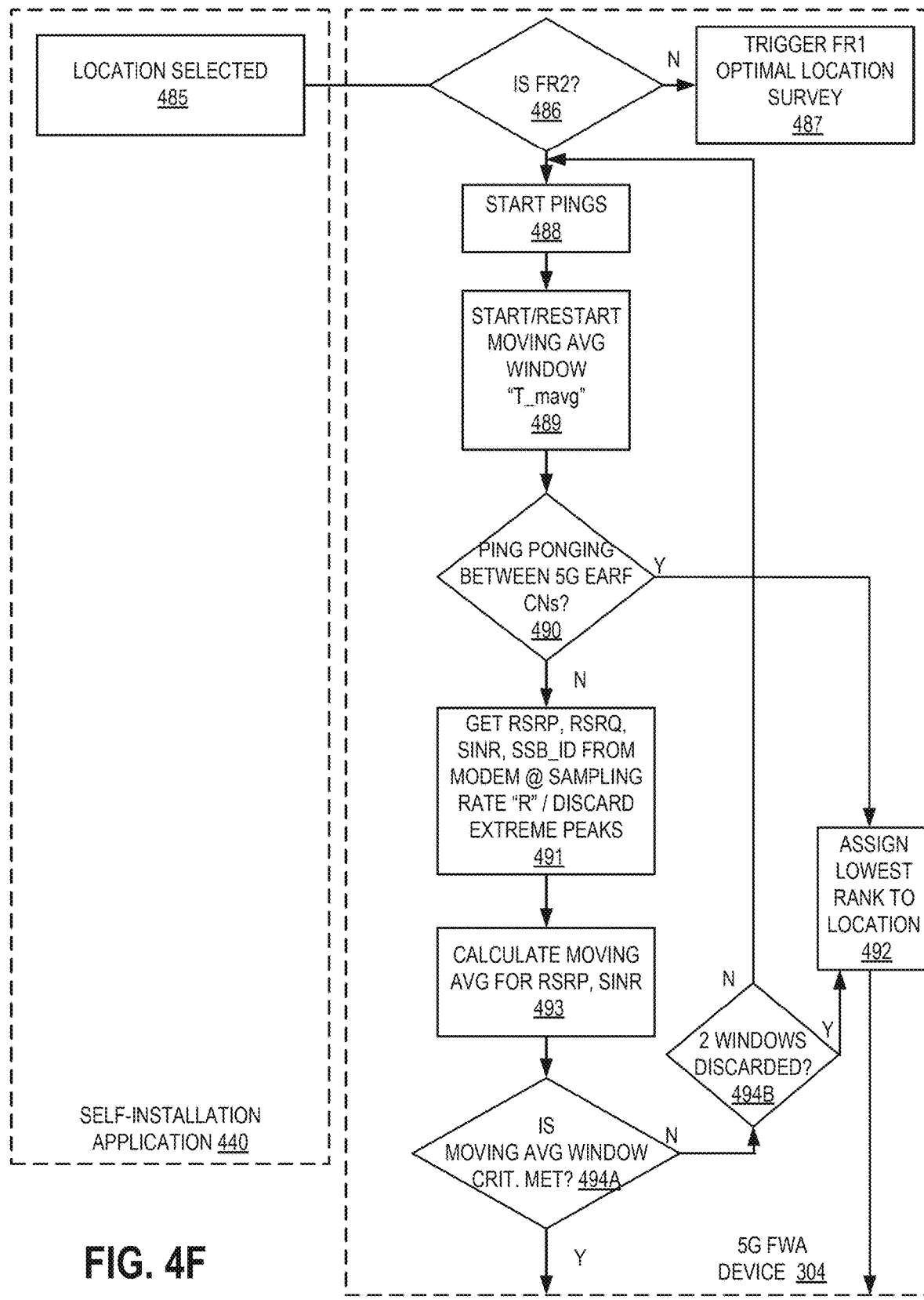
FIG. 4F is a flow chart illustrating example operations performed during a second frequency range fine measurement phase in accordance with one embodiment of the present disclosure.
Figure 4G:
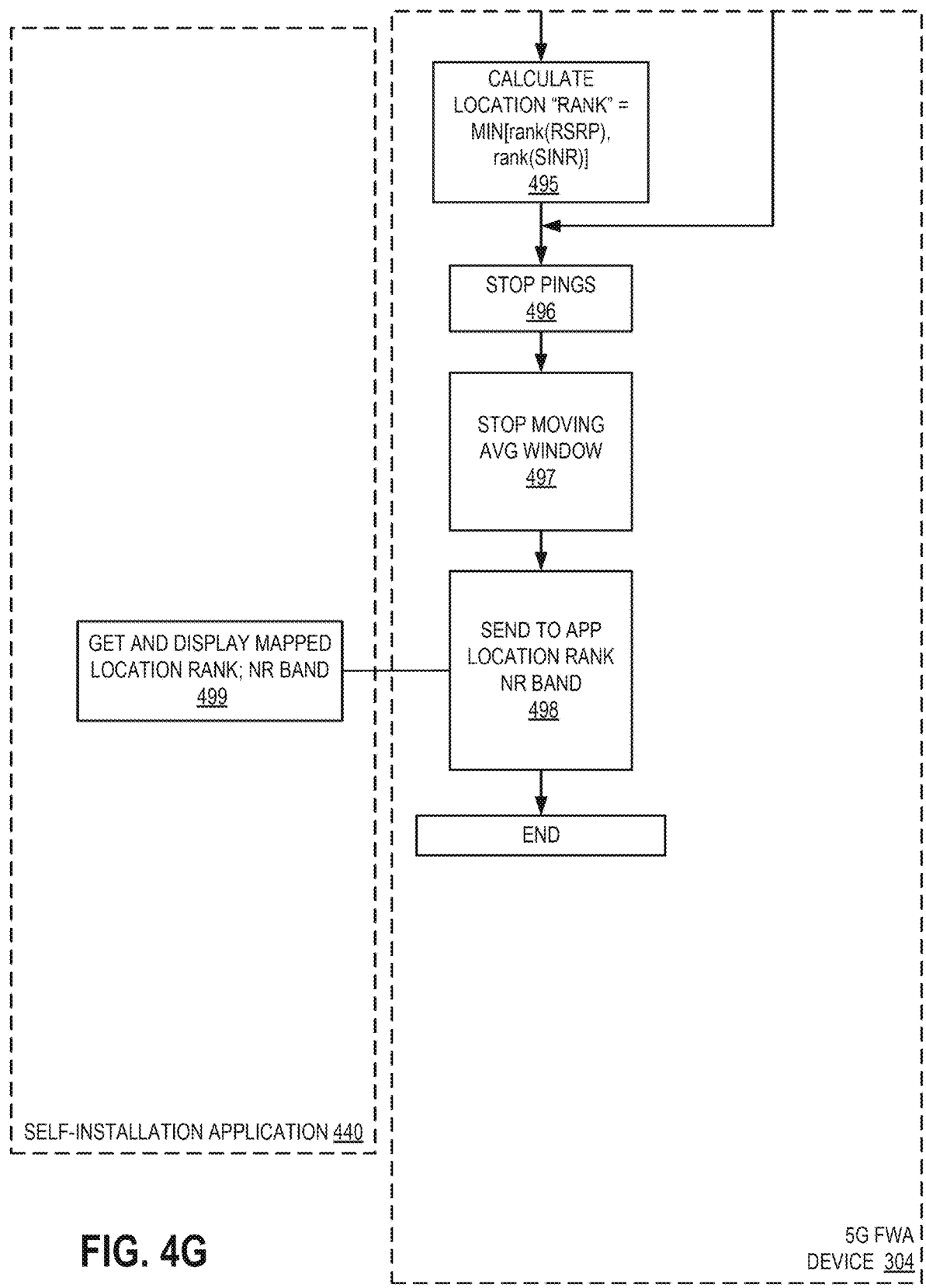
FIG. 4G is a continuation of the flow chart of FIG. 4F.

FIGS. 4F and 4G illustrate example operations that may be performed during a fine measurement phase in a second frequency range (e.g., which can correspond to FR2). It should be noted that the order of operation relative to FR1 and FR2 can vary. At operation 485 (similar to operation 470), upon selection of a location, a check is performed to determine whether the frequency range in use is FR2 at operation 486. If not, the FR1 optimized location assessment is triggered at operation 487 (and the fine measurement phase regarding FR1 may proceed as described above regarding FIGS. 4D and 4E. If so, 5G FWA device 304 may begin pinging the cell/BS to which it is attached at operation 488. At operation 489, a moving average window is started/restarted. As described above, in some embodiments, a moving average window of duration T_mavg can be started. RSRP and SINR can be sampled at a sampling rate of "R" Hz within this window, and RSRP and SINR averages are calculated within this window as well. Extreme peaks for SINR and RSRP can be discarded during the averaging process. A window with a high standard deviation, a high beam switch frequency, or a high channel switch frequency can be discarded. At operation 490, a check for ping ponging between 5G EARF CNs is performed If the ping pong effect is occurring, at operation 492, a lowest rank is assigned to the location. At operation 491, the RSRP, RSRQ, and SINR measurements are obtained from the modem of 5G FWA device 304 at a given sampling rate and extreme peak measurements are discarded (to rid, e.g., anomalous measurements, from the dataset comprising signal strength measurements. At operation 493, a moving average for RSRP and SINR may be calculated. At operation 494A, a check is performed to determine if the moving average window criteria is met, and if not, a check at operation 494B is performed to determine if two windows have been discarded, and the location can be assigned the lowest rank at operation 492. As illustrated in FIG. 4G, at operation 495, if the moving average window criteria is met at operation 494A, a location "rank" (which in some embodiments can equate to MIN[rank(RSRP), rank(SINR)]) can be calculated. At operation 496, the pinging of the cell(s) can stop, the moving average window can be stopped at operation 497, and location rank and new radio (NR) band information can be sent to self-installation application 440 at operation 498, where this information can be obtained and displayed by self-installation application 440 to a user at operation 499. It should be understood that the same/similar criteria for discarding extreme peak measurements and moving average window criteria as described above can be utilized in the FR2 fine measurement phase of operation. Additionally, a moving average window with a high beam switch frequency may result in discard the moving average window (and a new one may be started) if f_beam>F_BEAM. It should also be noted that beam switch criteria can be calculated based on RSRP variation ≥about 5 dBM.

It should further be understood that beam switching can be used as a criterion for window discarding. In FR2 (mmWave), the SSB_ID is used to identify a serving beam. Whenever there is a beam switch of the serving beam, a drop in the Modulation Coding Scheme (MCS) index is typically seen, and hence a drop in throughput. Accordingly, it would be preferable to stay on a given beam for as long as possible. Thus, when the frequency of beam switching exceeds the threshold F_BEAM, within the Moving Average Window, that window is discarded. In some embodiments, if the SSB_ID is not obtainable from the modem, a 5 dBM variation in 5G RSRP can be deemed an indication of the occurrence of a beam switch.

Figure 5A:
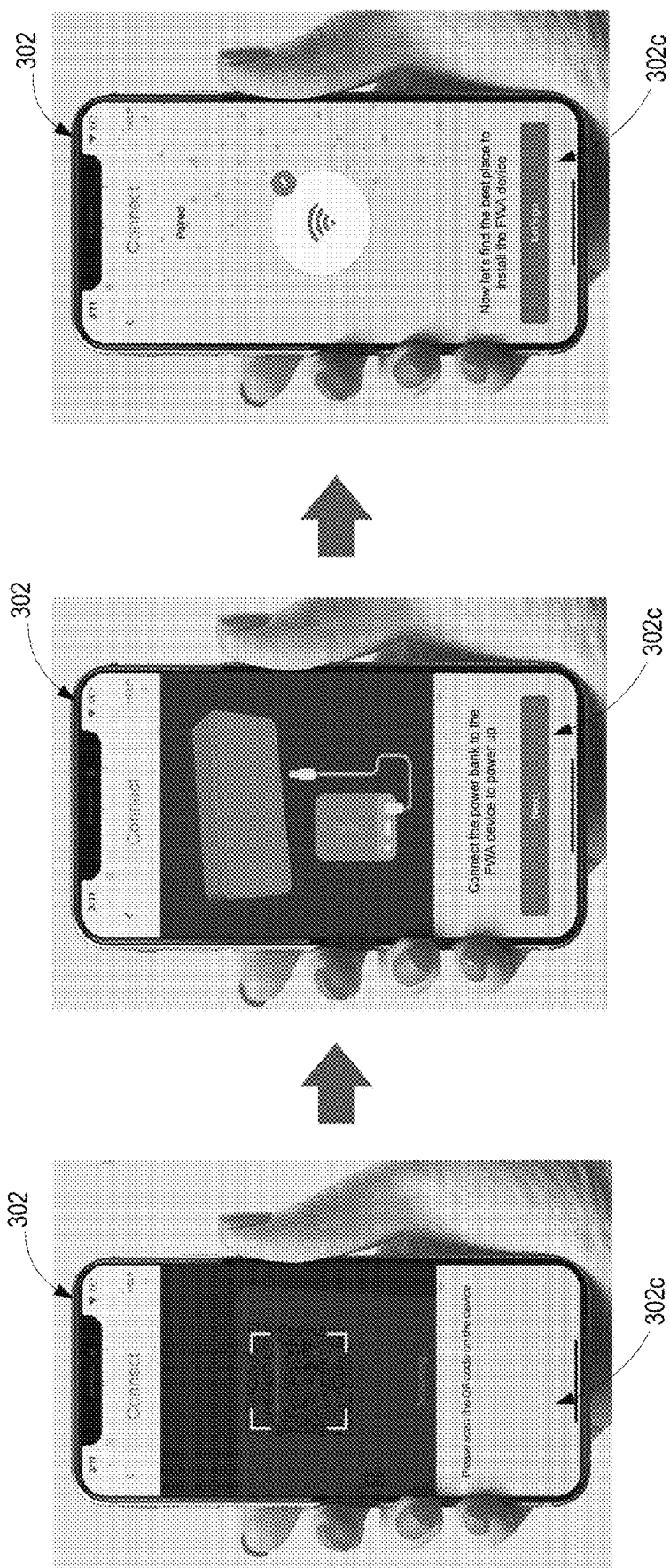
FIG. 5A illustrates example screenshots of an application used for self-installation of a 5G FWA device.
Figure 5B:
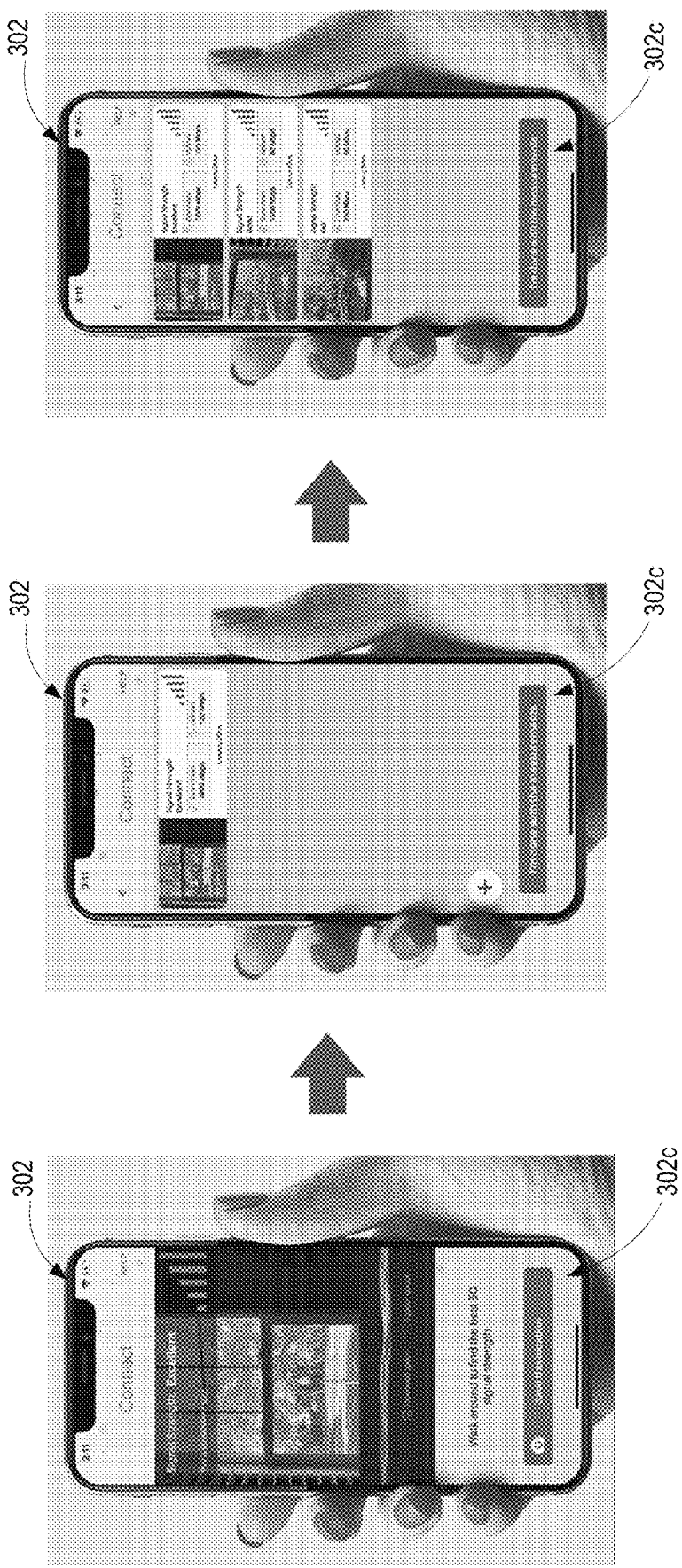
FIG. 5B illustrates additional example screenshots of an application used for self-installation of a 5G FWA device.
Figure 5C:
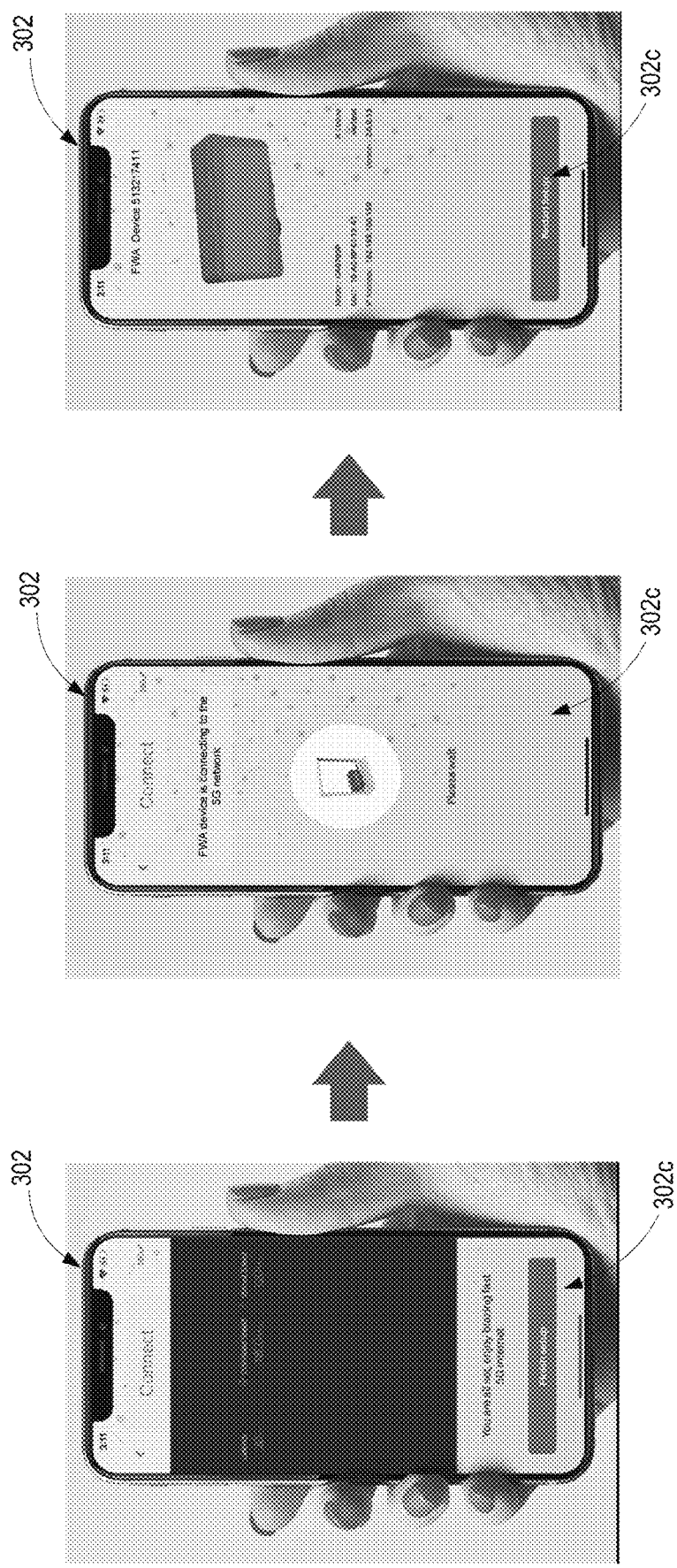
FIG. 5C illustrates still other example screenshots of an application used for self-installation of a 5G FWA device.

FIGS. 5A-5C illustrate various example screen shots of the disclosed self-installation application in accordance with various embodiments. Mobile device 302 is represented in FIG. 5A as having a display 302c through which various graphical/visual information, elements, instructions, commands, interactive features and the like may be presented. In some embodiments display 302c may be touchscreen display. Although not shown, mobile device 302 is understood to have microphones, speakers, and/or other interactive elements through which information may be input, received, transmitted, or otherwise communicated. It should be understood that more or less operations may be part of the self-installation application, and that the illustrated screen shots are examples only, and not meant to be limiting in any way, nor is the order in which the screen shots are illustrated/described indicative of any set or requisite order that must be followed.

FIG. 5A illustrates that a user, e.g., user 300, may scan a QR code associated with 5G FWA device 304 in order to identify 5G FWA device 304. Identification of 5G FWA device 304 may be useful in the event that user 300 seeks to install a plurality of 5G FWA devices, and the self-installation application may retain information regarding, e.g., operational characteristics of each of the plurality of 5G FWA devices, locations at which user 300 ultimately chooses to locate each of the plurality of 5G FWA devices, etc.

Further illustrated in FIG. 5A is a screen shot of the self-installation application instructing user 300 to connect 5G FWA device 304 to a power bank or other power source so that 5G FWA device 304 can operatively connect to a 5G small cell, e.g., 5G small cell 340. As noted above, in some embodiments, 5G FWA device 304 may include a battery that can be charged so that 5G FWA device 304 can remain operative without being tethered physically to a power source.

FIG. 5A illustrates another screen shot wherein confirmation is provided to the user 300 that mobile device 302 has been paired with 5G FWA device 304. Referring back to FIG. 4A, routines 425 may include routines that cause processor 421 of 5G FWA device 304 to engage in a pairing process with mobile device 302 so that 5G FWA device 304 and mobile device 302 can communicate with each other, exchange information with each other, e.g., received signal strength information, diagnostic information, control/management commands, etc. In accordance with various embodiments, one skilled in the art would understand how to effectuate pairing in accordance with the requisite wireless or wired communications standard/mechanism being used, e.g., Wi-Fi®, Bluetooth®, NFC, etc. It should be appreciated that various prompts, buttons, and/or other graphical/visual interactive elements may be presented by the self-installation application to user 300 that allow user 300 to control operation of the self-installation application, provide confirmation that a particular instruction/command has been followed, and the like.

FIG. 5B illustrates that upon user 300 moving to a location, e.g., location D of FIG. 3, user 300 may instruct the self-installation application to begin measuring received signal strength measured by 5G FWA device 304, performance rating, upload speeds, download speeds, latency, etc. In the example illustrated in FIG. 5B, the self-installation application provides a textual (or auditory) instruction to user 300 to walk about the space in which user 300 is currently present (e.g., structure 301) to sample received signal strengths. Again, the self-installation application may automatically initiate the taking of measurements or user 300 may command the self-installation application to being taking measurements. For example, and as alluded to above, the self-installation application may leverage the location-based services/functionality resident in mobile device 302. That is, subsequent to taking a first received signal strength measurement, or upon receiving any signal deemed to be from a nearby 5G small cell, the self-application may communicate a command to 5G FWA device 304 to begin taking signal strength measurements. Referring back to FIG. 4A, such a command may be transmitted from mobile device 302 wirelessly to wireless radio 447. Wireless receiver 449, in particular, may receive this command, sends the command to wireless transmitter 448, which relays the command to memory 422. Routines 425 may include routines that are triggered upon receipt of such a command to instruct processor 421 to command wireless communications circuit 413 to begin communicating with 5G small cell 340. Upon receipt of signals from 5G small cell 340 at antenna 417, the signals are transmitted to communication circuitry 416, which may determine the received signal strength of the received signals from 5G small cell 340. The received signal strength information may be passed to memory 422 for permanent, semi-permanent, or temporary storage. Routines 425 may include routines to pass that signal strength information via wireless radio 447 and antenna 446 to mobile device 302, whereupon the self-installation application may present, translate, or otherwise process the data for display to user 300 via display 302c (as illustrated in FIG. 5B).

As further illustrated in FIG. 5B, a photograph or other indication/identification information can be associated with gathered received signal strength information and/or diagnostic information. For example, the self-installation application may prompt user 300 to use mobile device 300's resident camera to take a picture of the location, a picture from the perspective of where 5G FWA device 304 is placed, etc. In other embodiments, the self-installation application may automatically trigger the resident camera of mobile device 300 to take a picture, take video, etc. In some embodiments, self-installation application may provide the ability for user 300 to input any desired identifying or other information to be associated with the location and saved with the gathered received signal strength information and/or diagnostic information.

The self-installation application may provide an interactive element to user 300 allowing user 300 to save the location and/or any related measurement/diagnostic information regarding the characteristic operation of 5G FWA device 304 at that location. If user 300 chooses to save this location/information at this location, FIG. 5B further illustrates that a list of saved locations and/or any associated information/data, which can be presented to user 300. It should be noted that a user may choose not to save the location/data and/or may choose to retake measurements/rerun the diagnostic tests. For example, there may have been a temporary obstruction at the particular location, or the user 300 may choose to reorient the 5G FWA device 304 to see if reorienting the 5G FWA device 304 in the same location may result in better operating characteristics. This process can be repeated as often as user 300 may desire. In some embodiments, the self-installation application may comprise a learning algorithm that is capable of determining whether, over some period of time, over some subset of measurement and/or diagnostic data, that the user 300 will not likely find a better location and/or orientation for the 5G FWA device 304, and may indicate as such to user 300.

In some embodiments, the self-installation application may be pre-loaded with information regarding 5G cells in the vicinity of the area(s) in which the user wishes to install the 5G FWA device. Therefore, the self-installation application may recommend certain locations/orientations that have a greater potential of providing the requisite connection quality. In some embodiments, the self-installation application may leverage the location-based services or functionality resident on the user's mobile device to aid in determining an optimal or preferred location/orientation of the 5G FWA device. For example, prior to or as part of initializing the self-installation application, user 300 may input or mobile device 302 may automatically input information regarding the user 300's current location and/or information regarding known 5G small cells. Accordingly, the self-installation application may provide some enhanced guidance as to the location and/or orientation that may be optimal for 5G FWA device 304. In some embodiments, the self-installation application may have previously stored information regarding previously-run measurements/diagnostic information, and the self-installation application may leverage that previous/historical information to again, provide enhanced guidance to user 300. For example, the self-installation application may analyze previously-run installation instances to determine if any locations/orientations would likely result in optimal performance of 5G FWA device 304. Alternatively, the self-installation application may filter out known locations/orientations that have already been tested and determined to result in poor or non-optimal operation of any 5G FWA device, including 5G FWA device 304. In some embodiments, as noted above, the identify of 5G FWA device may be obtained. Such information may be used to determine certain operating characteristics of 5G FWA device 304 that may impact determining a location/orientation for optimal operation. For example, 5G FWA device 304 may have a different antenna configuration from a previously-installed 5G FWA device 304. With this knowledge, the self-installation application may be able to provide guidance regarding location/orientation specifically tailored to 5G FWA device 304. In still other embodiments, the self-installation application may perform certain triangulation or similar techniques that analyze some or all the measurements/diagnostic information obtained for previously-visited locations/orientations so that the self-installation application may be able to better predict where user 300 should go/how user 300 should orient 5G FWA device 304 relative to a previous one(s) of locations/orientations.

As illustrated in FIG. 5B, user 300 may be given the option to end the measurement-taking phase of the self-installation process, e.g., upon the user 300 or the self-installation application being satisfied with the identified location(s)/orientation(s) tested. In the case of the self-installation application making such a determination, it should be understood that the self-installation application may be configured to compare, e.g., the current list of saved locations/orientations with one or more thresholds regarding one or more of the measured parameters, e.g., received signal strength, performance rating, data upload speed, data download speed, and/or latency. In some embodiments, combinations of factors may be taken into account when determining whether or not the location/orientation or some combination of locations/orientations are sufficient for a user 300 or the self-installation application to determine that the optimal or at least the best (for that situation) location/orientation has been identified.

FIG. 5C illustrates a plurality of screen shots that may be presented to user 300 on mobile device 302 signifying the closing/ending processes of the self-installation process. As illustrated in FIG. 5C, the self-installation application may display a final measurement/diagnostics test result for 5G FWA device 304 positioned at the desired location/orientation. FIG. 5C further illustrates that the self-installation application may initiate 5G service through 5G small cell 340 and reflect the corresponding progress through the self-installation application. FIG. 5C may further illustrate a dashboard presenting relevant information regarding 5G FWA device 304 and/or any relevant information, e.g., operational characteristics, identifying information, information on the installation, etc.

The above-described screenshots illustrated in FIGS. 5A-5C may include certain textual and/or visual/graphical prompts, suggestions, commands, instructions, and the like. For example, FIG. 5A illustrates a screen shot of the self-installation application that includes an instruction to user 300 that he/she should walk around to find the best 5G signal strength. FIG. 5C illustrates a screen shot of the self-installation application that indicates that the 5G FWA device is connecting to the 5G network. It should be understood that processor 302a of mobile device 300 may execute instructions or logic to determine operating status of the 5G FWA device to which it may be paired, e.g., 5G FWA device 304, operating status the self-installation application itself, etc. Moreover, processor 302a of mobile device 300 may execute instructions or logic to analyze current operating status (again of the self-installation application and/or 5G FW device 304) and translate such operating status into corresponding instructions, indications, prompts, and the like. For example, memory 302b of mobile device may comprise a repository of, e.g., textual indications, prompts, etc. that can be triggered to be presented via display 302c upon the operating condition of the self-installation application and/or 5G FWA device 304 reaching a certain state. In some embodiments, as noted above, the self-installation application may employ certain guidance logic, e.g., learning, feedback, predictive logic, etc. to provide guidance to a user. The processor 302a may execute instructions or logic to effectuate prompts, indicators, instructions, etc., commensurate with the guidance logic.

Figure 5D:
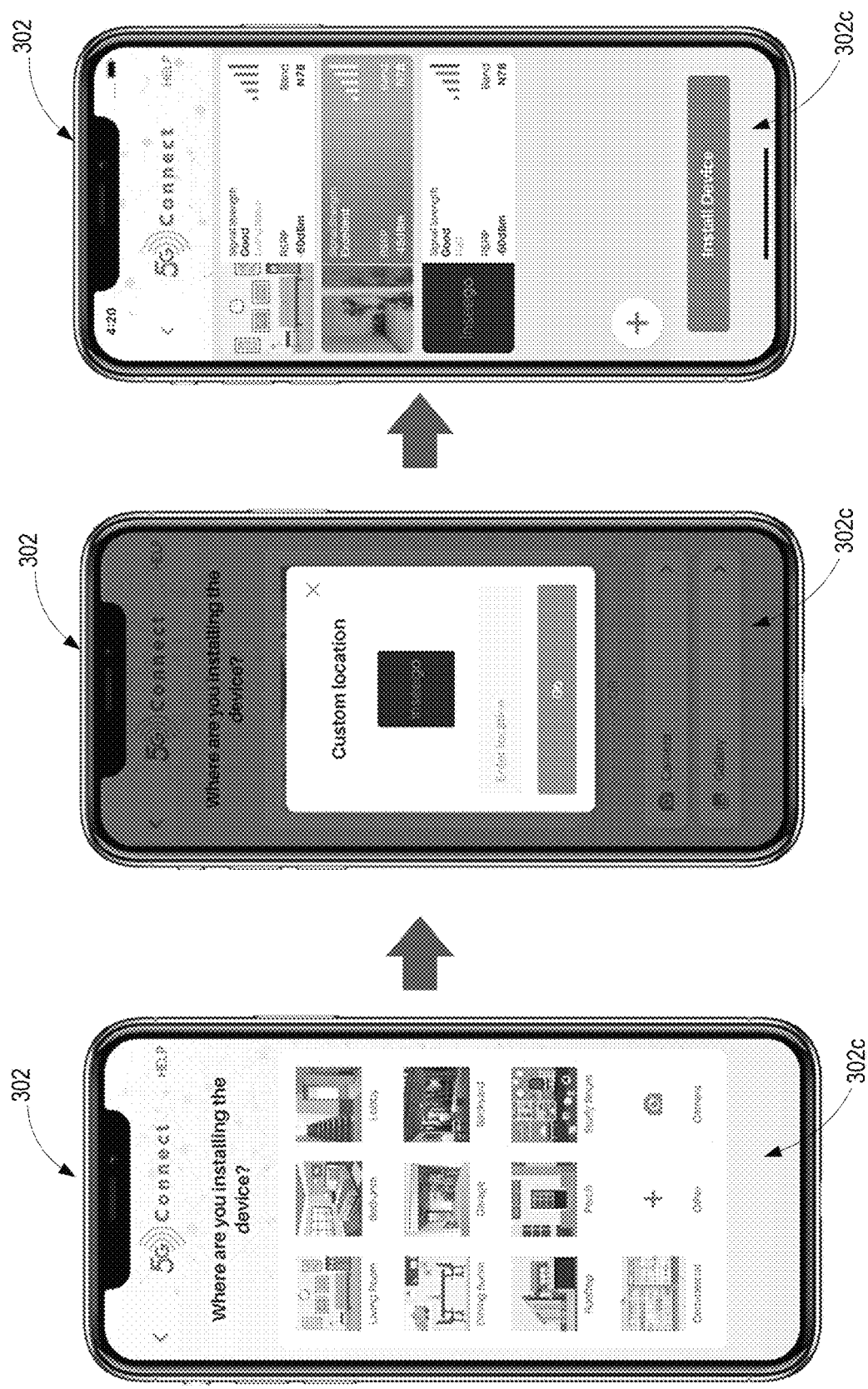
FIG. 5D illustrates example screenshots of an application used for installation of a 5G FWA device in accordance with another embodiment.
Figure 5E:
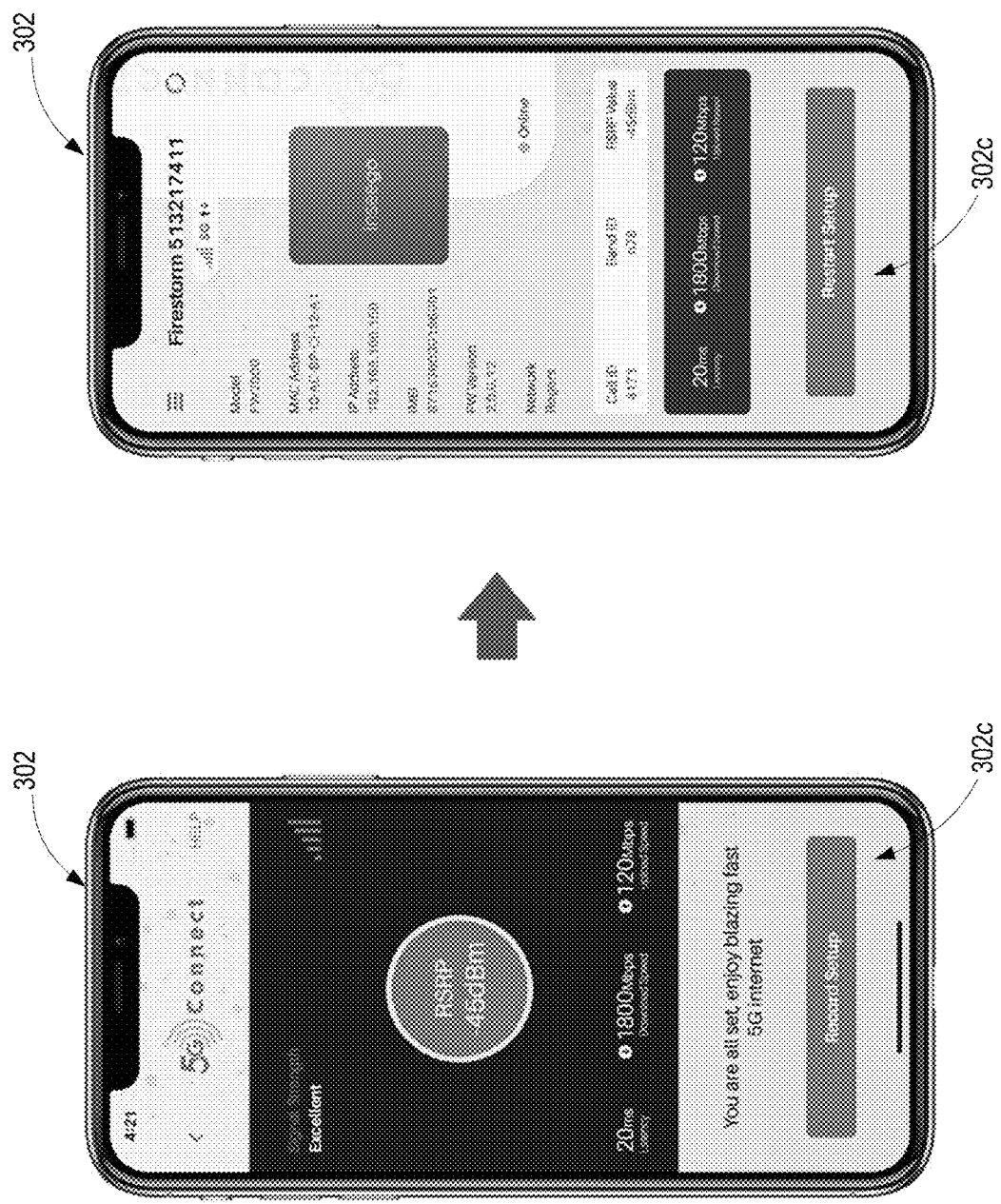
FIG. 5E illustrates example screenshots of the application of FIG. 5D.
Figure 5H:
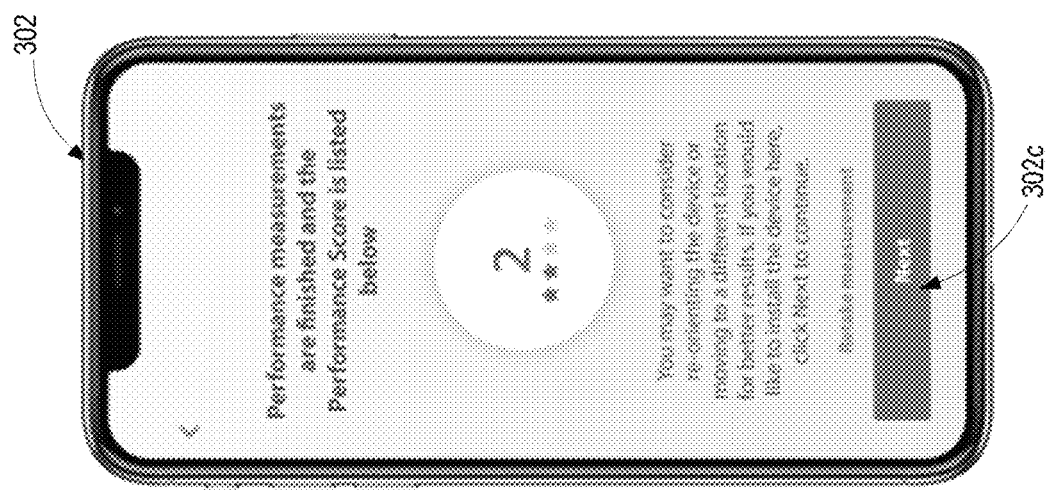
FIGS. 5F-5H illustrate additional example screen shots of the application of FIG. 5D.

In accordance with another embodiment, a "pro-installation" version of the self-installation application may be provided, where the same/similar operations as those illustrated in FIG. 5A and described above may be performed, e.g., presenting a scan option to associate the self-installation application running on mobile device 302 with 5G FWA device 304, presenting instructions to connect the 5G FWA device 304 to a portable power source, etc. It should be noted that in a pro-installation embodiment, the user need not necessarily engage in any button presses/input any information to the self-installation application up to this point. This is because a professional installer or someone with experience/knowledge installing such devices needs less guidance/direction/interaction with the self-installation application. FIGS. 5D-5E illustrate example screen shots/operations that may be presented with the pro-installation version (that are not necessarily presented in the previously-discussed embodiment of the self-installation application, again because the needs/interactions between the self-installation application and an end-user consumer may differ from that of a professional installer of communications/networking equipment).

FIG. 5D illustrates that the self-installation application may ask user 300, in this case, an electronics professional, installation professional, or other user with relatively more experience than an end-user consumer, where he/she intends to install 5G FWA device 304. In some embodiments, the self-installation application may present known, default areas that can depend on the building/location, e.g., commonly-encountered rooms in a residential dwelling, commonly-encountered areas in a business setting, etc. The self-installation application may provide further options for the user to add additional locations/take identifying photos thereof, etc. If this option is selected, the user may be presented with an option to describe or otherwise identify the location in which he/she intends to install 5G FWA device 304. Similar to FIG. 5B, a summary of signal strength/diagnostic information associated with various tested locations/orientations may be presented, along with an option to proceed/select one of the locations/orientations for installation.

FIG. 5E (similar to FIG. 5C) illustrates a plurality of screen shots that may be presented to user 300 on mobile device 302 signifying the closing/ending processes of the self-installation process. As illustrated in FIG. 5E, the self-installation application may display a final measurement/diagnostics test result for 5G FWA device 304 positioned at the desired location/orientation. FIG. 5E further illustrates that the self-installation application may initiate 5G service through 5G small cell 340 and reflect the corresponding progress through the self-installation application. FIG. 5E further illustrates that a dashboard presenting relevant information regarding 5G FWA device 304 and/or any relevant information, e.g., operational characteristics, identifying information, etc. may be presented FIG. 5E may also present an option to restart the installation/setup process if desired. For example, the user 300 may, ultimately not be satisfied with the performance of the 5G FWA device 304 at the chosen location/orientation and may restart the process of location/orienting the 5G FWA device 304. In some embodiments, as illustrated in FIG. 5E, a user may be given the option to record a setup. In this way, subsequently, a summary record of the installation results, e.g., resulting performance characteristics, installation location information, installer information, and so on may be aggregated, and can be presented as a report and/or the relevant information can be used to generate a report or summary presentation.

Figure 5G:
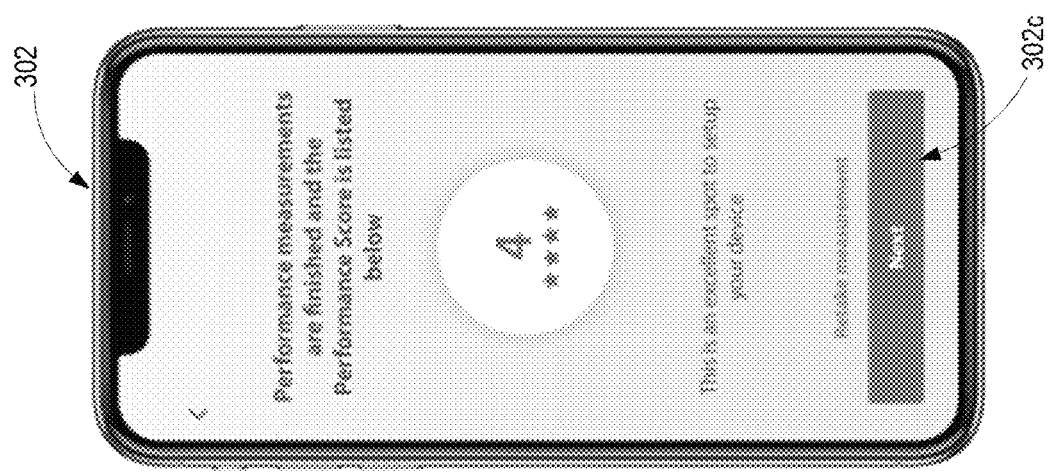
Figure 5F:
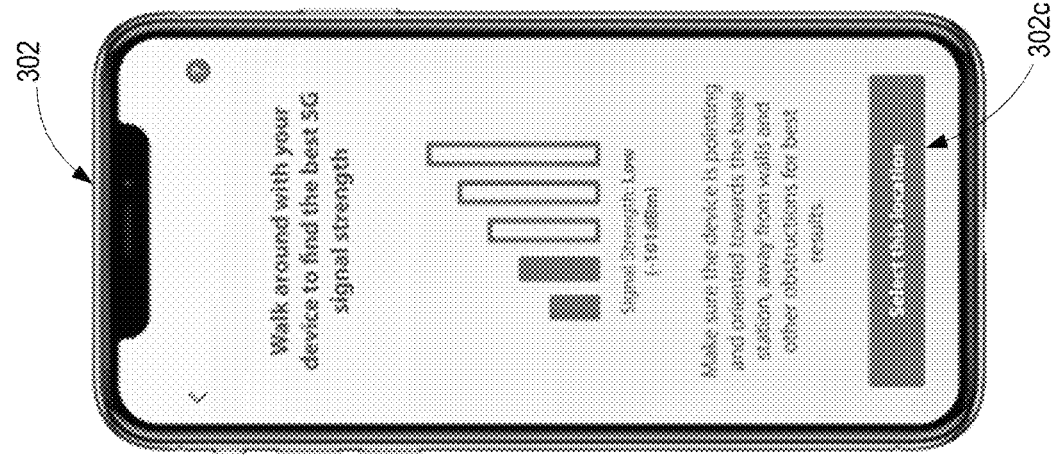

As alluded to and described above, orientation of 5G FWA device 304 in addition to location/placement can be considered to obtain optimal service. As illustrated in FIG. 5F, in one embodiment instructions may be provided on display 302C of mobile device 302 to advise the user to, e.g., orient 5G FWA device 304 to it is pointing towards a base station (small cell) and away from obstructions, walls, etc.). FIG. 5G illustrates an example screen where a numerical and/or star (or other) ranking can be provided to the user via the self-installation application. This can be provided in addition to or instead of textual signal strength "rankings" such as "Good," "Excellent," etc. as shown in FIG. 5D, as part of the ranking (see, e.g., FIGS. 4D, 4F and the corresponding descriptions above) process, the ranking assigned or calculated regarding a particular location/orientation may be provided to the user in addition to a suggestion (when the ranking is low (or falls below/exceeds some threshold) to attempt to re-orient 5G FWA device 304 to obtain better results.

Figure 6:
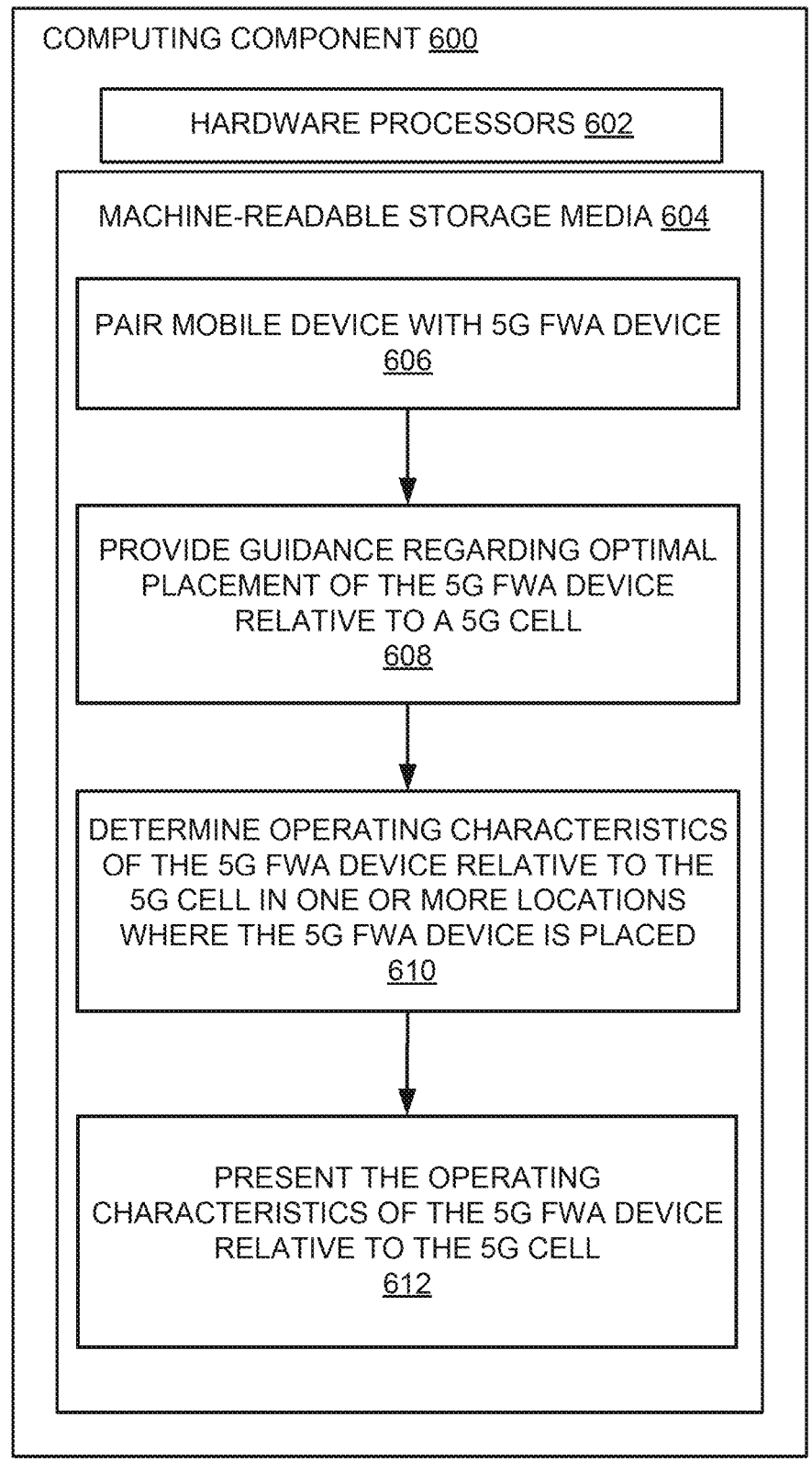
FIG. 6 illustrates an example computing component capable of executing instructions for effectuating self-installation of an FWA device in accordance with one embodiment of the disclosed technology.

FIG. 6 is a block diagram of an example computing component or device 600 for performing service assurance functions in accordance with one embodiment. Computing component 600 may be, for example, a server computer, a controller, or any other similar computing component capable of processing data and realizing the functionality of an assurance engine. For example, computing component 600 may be a processor of mobile device 302a or it may be an embodiment of processor 421. In the example implementation of FIG. 6, computing component 600 includes a hardware processor 602, and machine-readable storage medium 604.

Hardware processor 602 may be one or more Central Processing Units (CPUs), semiconductor-based microprocessors, and/or other hardware devices suitable for retrieval and execution of instructions stored in machine-readable storage medium, 604. Hardware processor 602 may fetch, decode, and execute instructions, such as instructions 606-612, to control processes or operations for guiding a user in self-installation of a 5G FWA device in accordance with one embodiment. As an alternative or in addition to retrieving and executing instructions, hardware processor 602 may include one or more electronic circuits that include electronic components for performing the functionality of one or more instructions, such as a Field Programmable Gate Array (FPGA), Application Specific Integrated Circuit (ASIC), or other electronic circuits.

A machine-readable storage medium, such as machine-readable storage medium 604, may be any electronic, magnetic, optical, or other physical storage device that contains or stores executable instructions. Thus, machine-readable storage medium 604 may be, for example, Random Access Memory (RAM), Non-Volatile RAM (NVRAM), an Electrically Erasable Programmable Read-Only Memory (EEPROM), a storage device, an optical disc, and the like. In some embodiments, machine-readable storage medium 604 may be a non-transitory storage medium, where the term "non-transitory" does not encompass transitory propagating signals. As described in detail below, machine-readable storage medium 604 may be encoded with executable instructions, for example, instructions 606-612, which may be representative of an embodiment of the aforementioned self-installation application.

Hardware processor 602 may execute instruction 606 to pair a mobile device with a 5G FWA device. As alluded to above, hardware processor 602 may be an embodiment of a processor of mobile device 302a, and upon executing a self-installation application that a user may utilize to determine an optimal location(s)/orientation(s) of a 5G FWA device the user wishes to install, the self-installation application may pair the mobile device and the 5G FWA device to allow the exchange of information or data therebetween.

Hardware processor 602 may execute instruction 608 to provide guidance regarding optimal placement of the 5G FWA device relative to a 5G cell. As noted above, the placement (e.g., location and/or orientation of a 5G FWA device) relative to a 5G cell, such as a small cell can be critically important in receiving 5G broadband service. Again, the mmWave signals propagated through a 5G network by 5G small cells are of such high frequency that they are often or likely unable to penetrate structures, obstacles, and the like, thereby making their operation sensitive to their placement. The guidance that the self-installation application may provide can vary from providing a user with a mechanism for, e.g., randomly traversing an area and performing tests to determine how well the 5G FWA device would operate in a certain location and/or orientation within that area. In other embodiments, the guidance that the self-installation application can include using information learned from previous installations (whether self-installed or installed in a conventional manner). For example, information regarding the location/orientation of a previously-installed 5G FWA device(s) or information regarding attempts to previously install a 5G FWA device(s) may be used to predict optimal locations/orientations or used to filter out non-optimal locations/orientations, etc.

Hardware processor 602 may execute instruction 610 to determine operating characteristics of the 5G FWA device relative to the 5G cell in one or more locations where the 5G FWA device is placed (temporarily during the testing/determining of optimal location/orientation). As noted above, an optimal or preferable location/orientation of the 5G FWA device may be premised on the operating characteristics, such as received signal strength, performance rating, data upload speed, data download speed, and/or latency experienced by the 5G FWA device at a particular location depending on its connectivity to the 5G cell. It should be understood that in some embodiments, the 5G FWA device may be able to potentially receive service from more than one 5G cell. Accordingly, the aforementioned testing, taking of measurements, running of diagnostic tests, etc. may be performed relative to each or some subset of the multiple 5G cells that could potentially service the 5G FWA device.

Hardware processor 602 may execute instruction 612 to present the operating characteristics of the 5G FWA device relative to the 5G CELL, e.g., to the user of the mobile device. In this way, a user of the self-installation application may be made aware of the operating characteristics of the 5G FWA device that may determine the optimal placement of the 5G FWA device. In some embodiments the user may be an end-consumer, or the user may be a professional installer. Although various embodiments have been described in the context of 5G wireless broadband services and/or devices, the self-installation application disclosed herein may be adapted for use in other contexts where location/orientation of a device requires or would benefit from determining optimal or preferred placement.

Figure 7:
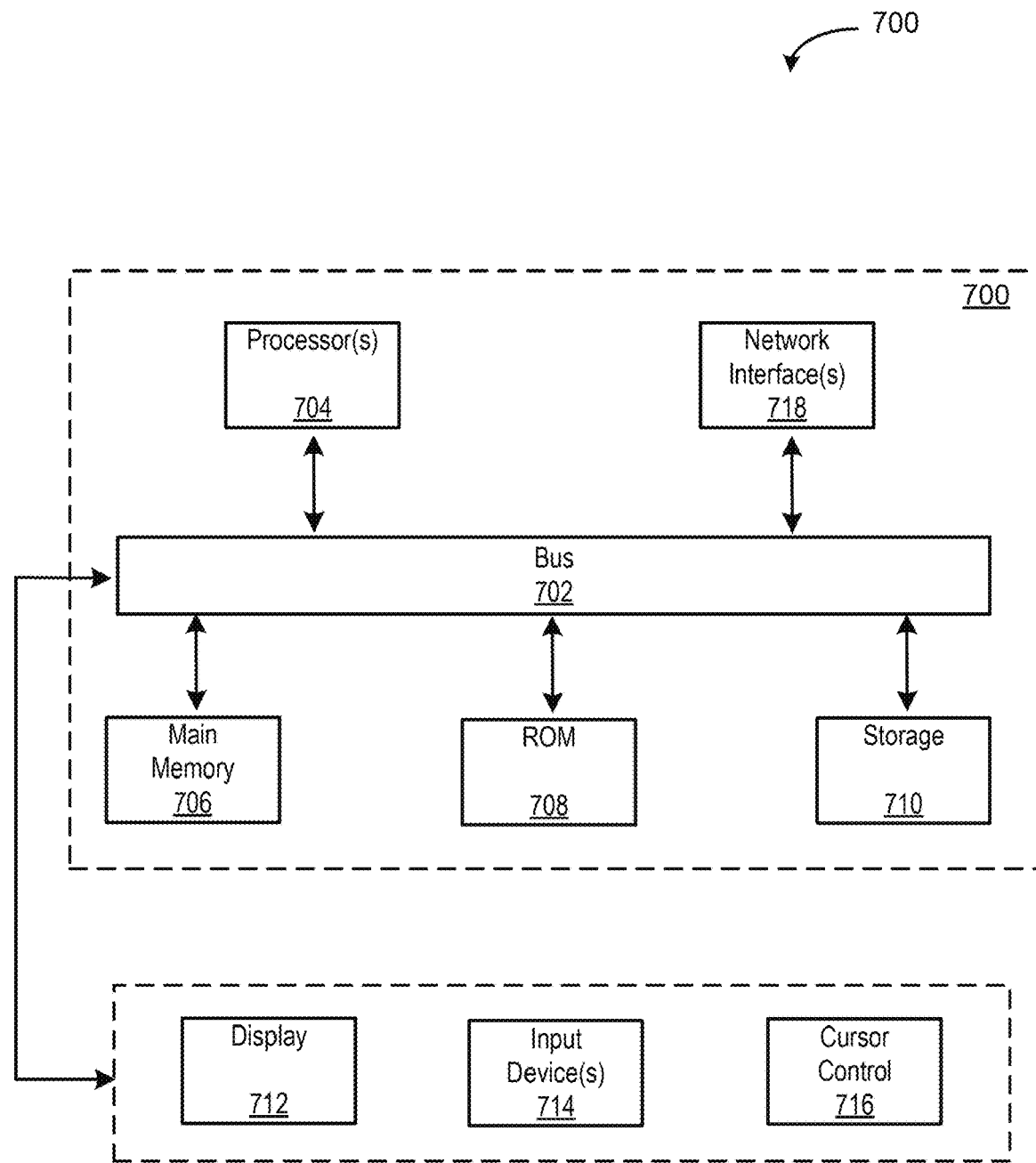
FIG. 7 is an example computing component that may be used to implement various features of embodiments described in the present disclosure.

FIG. 7 depicts a block diagram of an example computer system 700 in which various of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a Random Access Memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a Read Only Memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions. Also coupled to bus 702 are a display 712 for displaying various information, data, media, etc., input device(s) 714 for allowing a user of computer system 700 to control, manipulate, and/or interact with computer system 700. One manner of interaction may be through a cursor control 716, such as a computer mouse or similar control/navigation mechanism.

In general, the word "engine," "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A mobile device, comprising:
   a processor; and
   a memory unit operatively coupled to the processor, the memory unit including computer code that when executed, causes the processor to:
   pair the mobile device with an end user 5G Fixed Wireless Access (FWA) device;
   provide guidance regarding optimal placement of the end user 5G FWA device relative to a 5G cell;
   determine operating characteristics of the end user 5G FWA device relative to the 5G cell in one or more locations where the end user 5G FWA device is placed; and
   present the operating characteristics of the end user 5G FWA device relative to the 5G cell via the mobile device.

2. The mobile device of claim 1, wherein the computer code that when executed causes the processor to pair the mobile device with the end user 5G FWA device further comprises computer code that when executed causes the processor to perform the pairing over a short-range wireless communications connection.

3. The mobile device of claim 1, wherein the computer code that when executed causes the processor to pair the mobile device with the end user 5G FWA device further comprises computer code that when executed causes the processor to perform the pairing over a wired communications connection.

4. The mobile device of claim 1, wherein the computer code that when executed causes the processor to determine the operating characteristics of the end user 5G FWA device further comprises computer code that when executed causes the processor to obtain from the end user 5G FWA device, received signal strength measurements obtained by the end user 5G FWA device.

5. The mobile device of claim 4, wherein the computer code that when executed causes the processor to present the operating characteristics of the end user 5G FWA device further comprises computer code that when executed causes the processor to translate the received signal strength measurements into at least one of visual and auditory indications representative of the received signal strength measurements understandable to a user of the mobile device.

6. The mobile device of claim 4, wherein the received signal strength measurements comprise at least one of Reference Signal Received Power (RSRP), Reference Signal Received Quality (RSRQ), and Signal to Interference plus Noise Ratio (SINR) parameters of a reference signal received from the 5G cell.

7. The mobile device of claim 1, wherein the computer code that when executed causes the processor to provide guidance further comprises computer code that presents at least one of visual and auditory indications representative of instructions to at least one of move a location of the end user 5G FWA device and change an orientation of the end user 5G FWA device.

8. The mobile device of claim 1, wherein the computer code that when executed causes the processor to present the operating characteristics of the end user 5G FWA device further comprises computer code that when executed causes the processor to present at least one of visual and auditory indications representative of at least one of performance rating, data upload speed, data download speed, and latency experienced by the end user 5G FWA device upon connecting to the 5G cell.

9. The mobile device of claim 1, wherein the memory unit includes further computer code that when executed causes the processor to associate the operating characteristics of the end user 5G FWA device with identifying information identifying each of the one or more locations where the end user 5G FWA device is placed.

10. The mobile device of claim 1, wherein the 5G cell comprises a 5G small cell base station.

11. The mobile device of claim 1, wherein the memory unit includes further computer code that when executed causes the processor to record information regarding the operating characteristics of the end user 5G FWA device associated with each of the one or more locations, and present a summary of the operating characteristics of the 5G FWA device associated with each of the one or more location.

12. A method of determining placement of an end user 5G Fixed Wireless Access (FWA) device, comprising:
    determining operating characteristics of the end user 5G FWA device upon connecting to a 5G cell;
    presenting at least one of visual and auditory representations of the operating characteristics of the end user 5G FWA device to a user that is at least one of locating and orienting the end user 5G FWA device relative to a 5G cell providing 5G broadband wireless service, along with at least one of visual and auditory cues guiding the user regarding at least one of a location and orientation resulting in desired operating characteristics of the end user 5G FWA device upon connecting to the 5G cell.

13. The method of claim 12, wherein the presenting of the at least one of the visual and auditory representations of the operating characteristics and the at least one of the visual and auditory cues occurs via at least one of a display and a speaker implemented on the end user 5G FWA device.

14. The method of claim 12, wherein the presenting of the at least one of the visual and auditory representations of the operating characteristics and the at least one of the visual and auditory cues occurs via at least one of a display and a speaker implemented on a mobile device.

15. The method of claim 14, further comprising undergoing a pairing process to effectuate wireless or wired communications between the mobile device and the end user 5G FWA device.

16. The method of claim 15, wherein the pairing process is effectuated over a short-range wireless communications connection.

17. The method of claim 12, wherein the operating characteristics comprises received signal strength measurements obtained by the end user 5G FWA device.

18. The method of claim 17, wherein the received signal strength measurements comprise at least one of Reference Signal Received Power (RSRP), Reference Signal Received Quality (RSRQ), and Signal to Interference plus Noise Ratio (SINR) values of a reference signal received from the 5G cell.

19. The method of claim 18, wherein the reference signal comprises a 5G high-band mmWave reference signal.

20. The method of claim 12, wherein the operating characteristics comprises at least one of performance rating, data upload speed, data download speed, and latency experienced by the end user 5G FWA device upon connecting to the 5G cell.

21. The method of claim 12, wherein the 5G cell comprises a 5G small cell base station.

\* \* \* \* \*